US009122321B2

(12) United States Patent
Perez et al.

(10) Patent No.: US 9,122,321 B2
(45) Date of Patent: Sep. 1, 2015

(54) COLLABORATION ENVIRONMENT USING SEE THROUGH DISPLAYS

(75) Inventors: Kathryn Stone Perez, Kirkland, WA (US); John Clavin, Seattle, WA (US); Kevin A. Geisner, Mercer Island, WA (US); Stephen G. Latta, Seattle, WA (US); Brian J. Mount, Seattle, WA (US); Arthur C. Tomlin, Bellevue, WA (US); Adam G. Poulos, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 575 days.

(21) Appl. No.: 13/464,941

(22) Filed: May 4, 2012

(65) Prior Publication Data

US 2013/0293468 A1 Nov. 7, 2013

(51) Int. Cl.
*G06F 3/033* (2013.01)
*G06F 3/01* (2006.01)
(Continued)

(52) U.S. Cl.
CPC .............. *G06F 3/033* (2013.01); *G02B 27/017* (2013.01); *G06F 3/011* (2013.01); *G06F 3/013* (2013.01);
(Continued)

(58) Field of Classification Search
CPC ......... G06F 3/033; G06F 3/011; G06F 3/013; G06F 21/00
USPC ........ 345/7, 8, 9, 156, 158; 2/6.1, 6.6, 9, 410, 2/422, 423, 424; 348/E5.145, E13.036, 348/E13.041; 351/41, 124, 131, 132, 136; 359/618, 629, 630, 642, 643, 811, 815; 362/103, 105; 455/343.1
See application file for complete search history.

(56) References Cited

U.S. PATENT DOCUMENTS 6,020,930 A 2/2000 Legrand
7,038,699 B2 5/2006 Sato et al.
(Continued)

FOREIGN PATENT DOCUMENTS

CN 101390390 A 3/2009
WO 2011160076 A2 12/2011

OTHER PUBLICATIONS

Poupyrev, et al., "Developing a Generic Augmented Reality Interface", In Proceedings of Computer, vol. 35 Issue 3, Mar. 2002, pp. 44-50.
(Continued)

*Primary Examiner* — Priyank Shah
(74) *Attorney, Agent, or Firm* — Micah Goldsmith; Judy Yee; Micky Minhas

(57) ABSTRACT

A see-through, near-eye, mixed reality display device and system for collaboration amongst various users of other such devices and personal audio/visual devices of more limited capabilities. One or more wearers of a see through head mounted display apparatus define a collaboration environment. For the collaboration environment, a selection of collaboration data and the scope of the environment are determined. Virtual representations of the collaboration data in the field of view of the wearer, and other device users are rendered. Persons in the wearer's field of view to be included in collaboration environment and who are entitled to share information in the collaboration environment are defined by the wearer. If allowed, input from other users in the collaboration environment on the virtual object may be received and allowed to manipulate a change in the virtual object.

20 Claims, 27 Drawing Sheets

(51) Int. Cl.
*G06F 21/00* (2013.01)
*G06T 19/00* (2011.01)
*G02B 27/01* (2006.01)

(52) U.S. Cl.
CPC .............. *G06F 21/00* (2013.01); *G06T 19/006* (2013.01); *G02B 2027/014* (2013.01); *G02B 2027/0138* (2013.01); *G02B 2027/0178* (2013.01); *G02B 2027/0187* (2013.01); *G06T 2219/024* (2013.01)

(56) References Cited

U.S. PATENT DOCUMENTS

| | | | |
|---|---|---|---|
| 7,199,301 B2 | 4/2007 | Prittwitz | |
| 7,587,747 B2 | 9/2009 | Maguire, Jr. | |
| 7,632,187 B1 | 12/2009 | Farley et al. | |
| 8,217,995 B2* | 7/2012 | Dobbins et al. | 348/53 |
| 2005/0198661 A1 | 9/2005 | Collins et al. | |
| 2008/0002262 A1 | 1/2008 | Chirieleison | |
| 2008/0133336 A1 | 6/2008 | Altman et al. | |
| 2009/0217315 A1 | 8/2009 | Malik et al. | |
| 2010/0079356 A1 | 4/2010 | Hoellwarth | |
| 2010/0103196 A1 | 4/2010 | Kumar et al. | |
| 2010/0321389 A1* | 12/2010 | Gay et al. | 345/427 |
| 2011/0018903 A1 | 1/2011 | Lapstun et al. | |
| 2011/0185437 A1* | 7/2011 | Tran et al. | 726/28 |
| 2011/0213664 A1 | 9/2011 | Osterhout | |
| 2011/0221656 A1 | 9/2011 | Haddick et al. | |
| 2011/0310227 A1 | 12/2011 | Konertz | |
| 2012/0019557 A1* | 1/2012 | Aronsson et al. | 345/633 |
| 2012/0183137 A1* | 7/2012 | Laughlin | 380/200 |
| 2012/0249416 A1* | 10/2012 | Maciocci et al. | 345/156 |
| 2012/0249741 A1* | 10/2012 | Maciocci et al. | 348/46 |
| 2013/0038510 A1 | 2/2013 | Brin et al. | |
| 2013/0044042 A1 | 2/2013 | Olsson et al. | |
| 2013/0135180 A1* | 5/2013 | McCulloch et al. | 345/8 |
| 2013/0147687 A1* | 6/2013 | Small et al. | 345/8 |
| 2013/0293577 A1* | 11/2013 | Perez et al. | 345/633 |
| 2013/0314303 A1* | 11/2013 | Osterhout et al. | 345/8 |

OTHER PUBLICATIONS

Zhu, et al., "Personalized In-store E-Commerce with the PromoPad: An Augmented Reality Shopping Assistant", In Proceedings of Electronic Journal for E-commerce Tools and Applications, vol. 1 Issue 3, 2004, 19 pages.
Bajura, et al., "Merging Virtual Objects with the Real World: Seeing Ultrasound Imagery within the Patient", In Proceedings of 19th Annual Conference on Computer Graphics and Interactive Techniques, vol. 26 Issue 2, Jul. 1992, pp. 203-210.
Ajanki, et al., "Ubiquitous Contextual Information Access with Proactive Retrieval and Augmentation", In Proceedings of 4th International Workshop on Ubiquitous Virtual Reality, Mar. 8, 2010, 5 pages.
Katz, Leslie, "Tele Scouter Sends Translations Right to your Retina", Published on: Nov. 2, 2009, Available at: http://news.cnet.com/8301-17938_105-10388668-1.html?tag=mncol;txt.
Cowper, et al., "Improving Our View of the World: Police and Augmented Reality Technology", In Federal Bureau of Investigation, 2003, 68 pages.
Nilsson, et al., "Hands Free Interaction with Virtual Information in a Real Environment: Eye Gaze as an Interaction Tool in an Augmented Reality System", In Journal of PsychNology, vol. 7, Issue 2, 2009, pp. 175-196.
van Krevelen, et al., "A Survey of Augmented Reality Technologies, Applications and Limitations", The International Journal of Virtual Reality, vol. 9, Issue 2, Jun. 2010, pp. 1-20.
Kato, et al., "Marker Tracking and HMD Calibration for a Video-based Augmented Reality Conferencing System", In Proceedings of the 2nd IEEE and ACM International Workshop on Augmented Reality, Oct. 20-21, 1999, pp. 85-94.
Peternier, et al., "Chloe@University: An indoors, HMD-based Mobile Mixed Reality Guide", Retrieved on: Nov. 14, 2011, Available at: http://infoscience.epfl.ch/record/116211/files/Chloe_VRST07_FINAL.pdf.
"EON Coliseum", Retrieved on: Nov. 14, 2011, Available at: http://www.eonexperience.com/Coliseum.aspx.
Reitmayr, et al., "Collaborative Augmented Reality for Outdoor Navigation and Information Browsing", In Proceedings of the Symposium on Location Based Services and TeleCartography, 2004, 11 pages.
Fuhrman, et al., "Concept and Implementation of a Collaborative Workspace for Augmented Reality", In Vienna University of Technology, vol. 18, Issue 3, 1999, 11 pages.
Chinese Office Action dated Nov. 27, 2013, Chinese Patent Application No. 201110371508.9.
English translation of the text of the 1st Office Action dated Nov. 27, 2013, Chinese Patent Application No. 201110371508.9.
English Abstract of Chinese Publication No. CN101390390 published on Mar. 18, 2009.
International Search Report and Written Opinion dated Mar. 4, 2015, International Patent Application No. PCT/US2013/039424, 9 pages.
Thad Starner et al: "Wearable Computing and Augmented Reality" in M.I.T. Media Lab Vision and Modeling Group Technical Report No. 335, Nov. 1995.
International Preliminary Report on Patentability dated Mar. 26, 2015, International Patent Application No. PCT/US2013/039424, 6 pages.

* cited by examiner

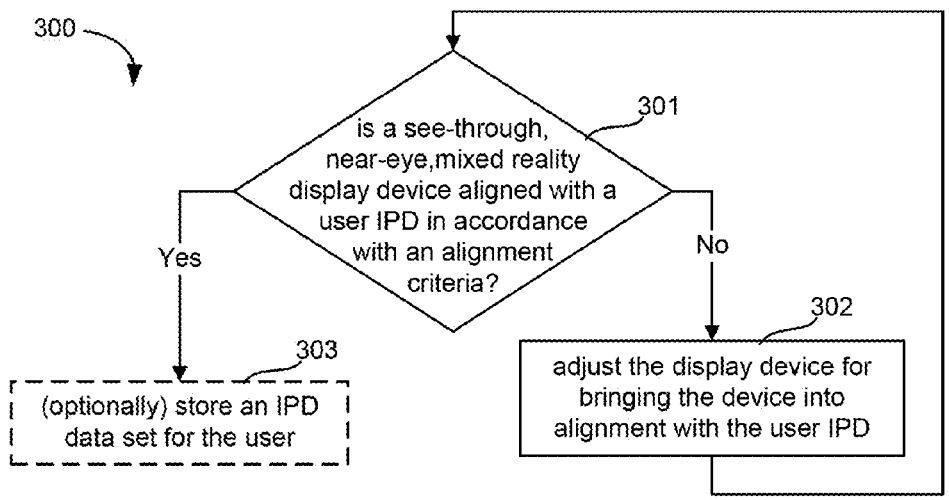
FIG. 3A
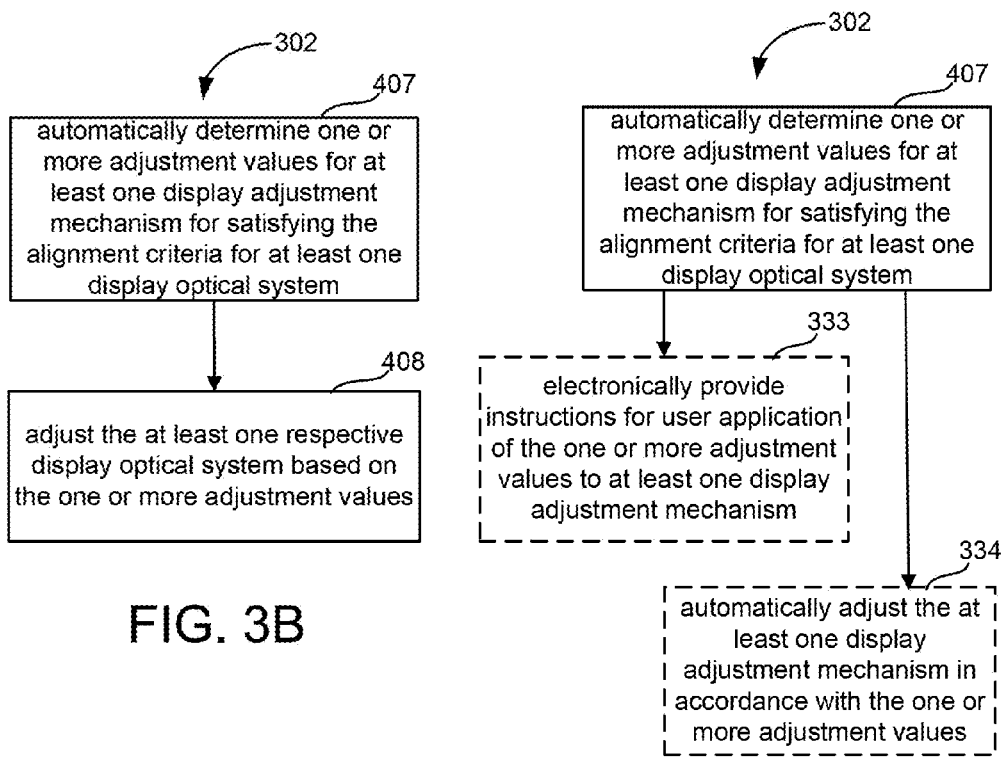
FIG. 3B
FIG. 3C

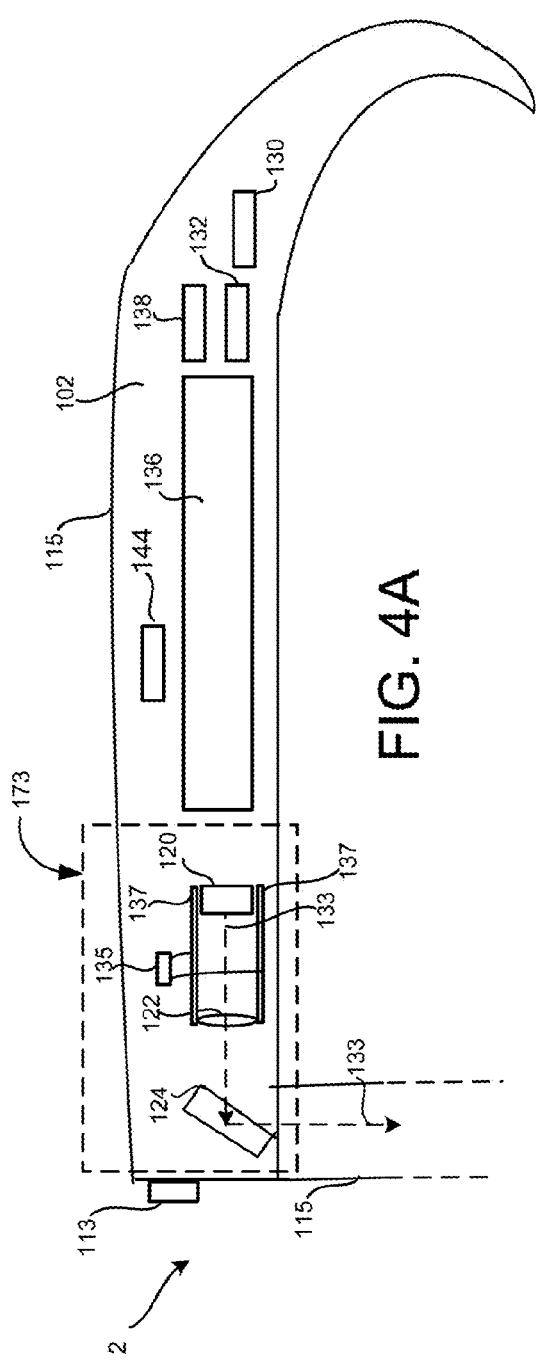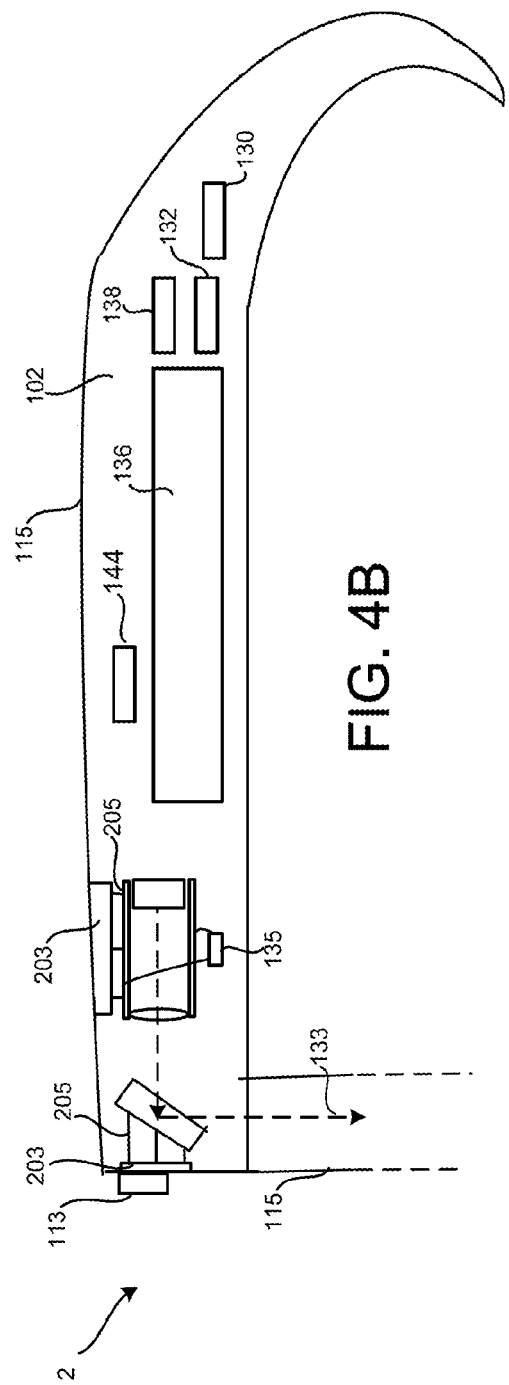

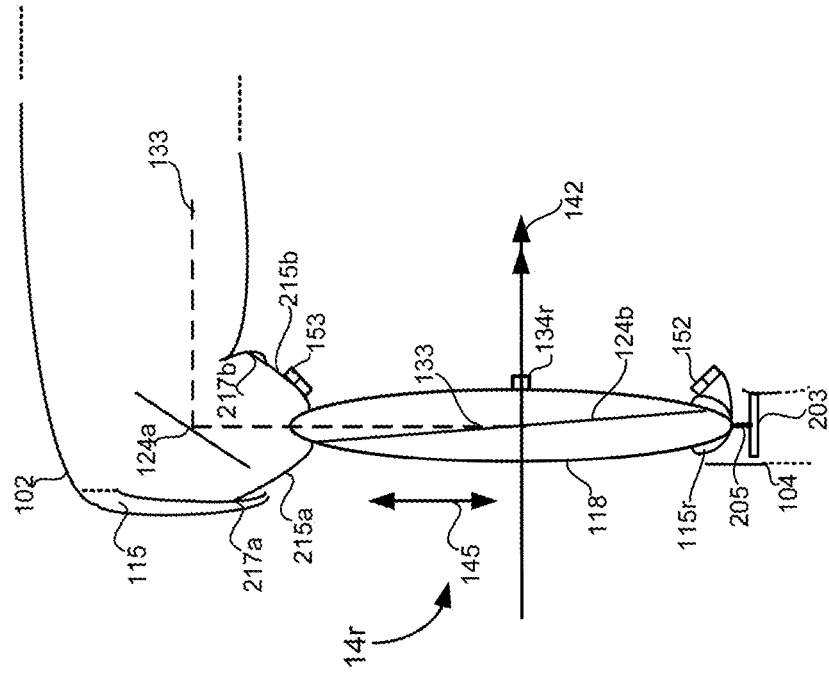
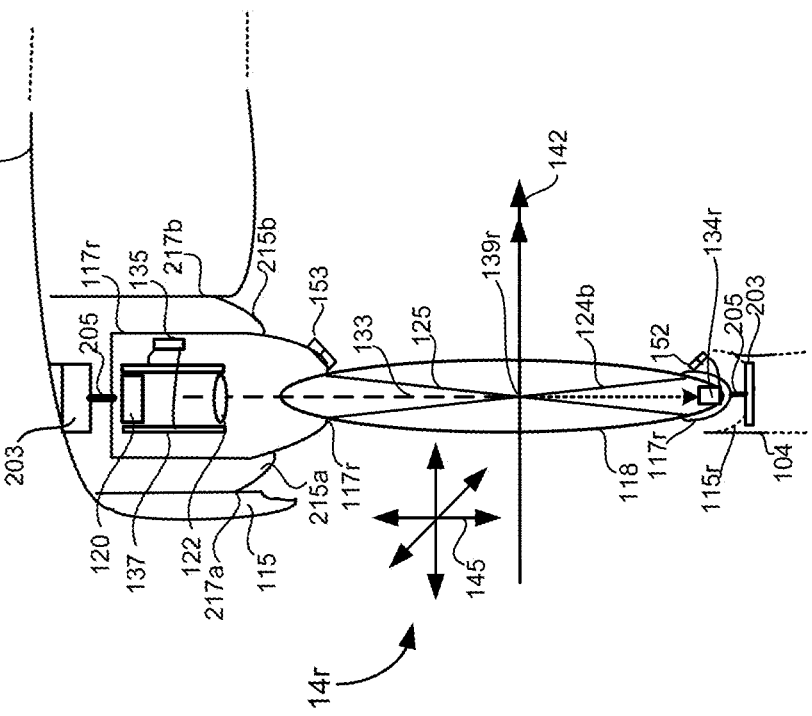

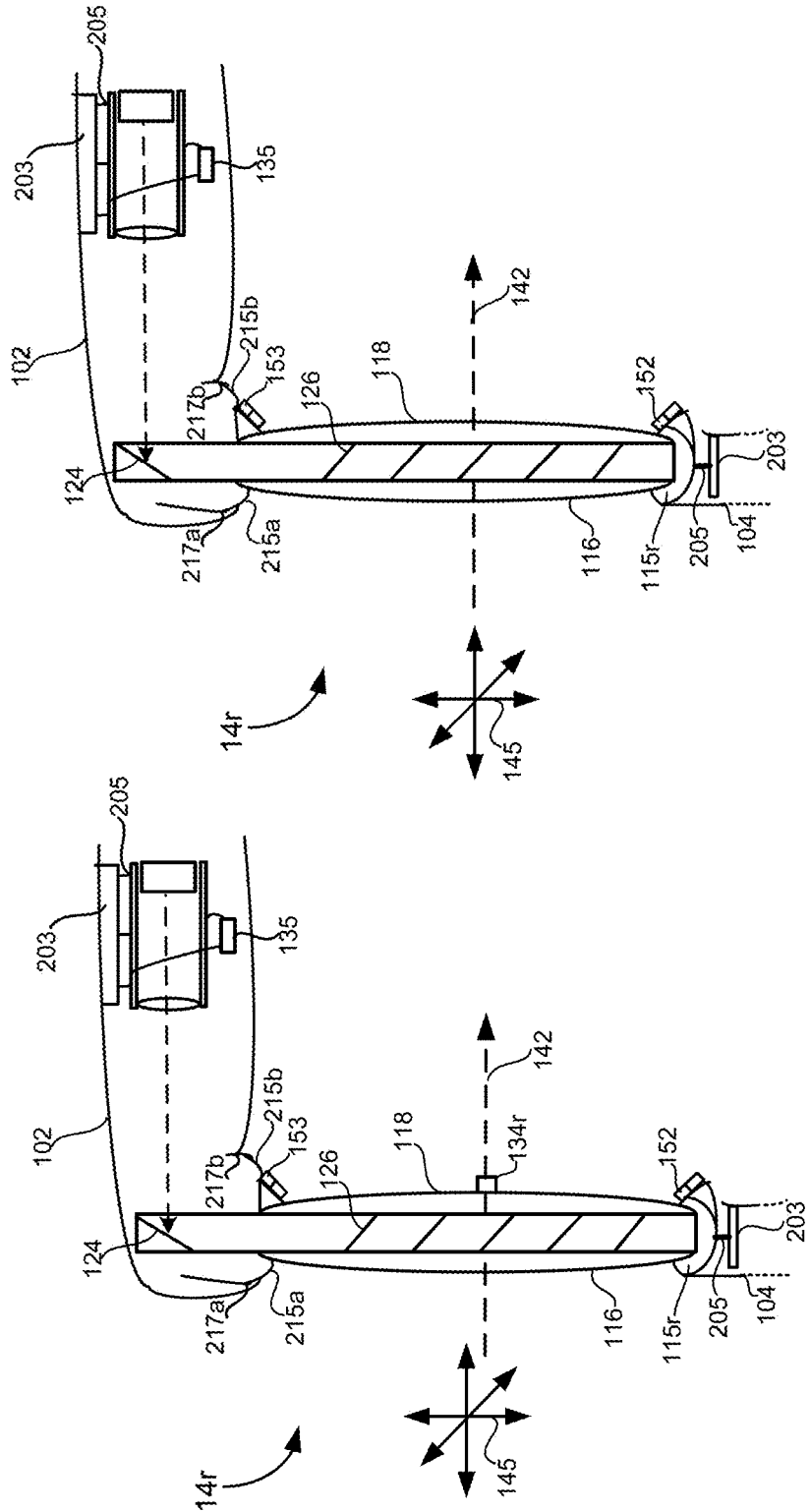

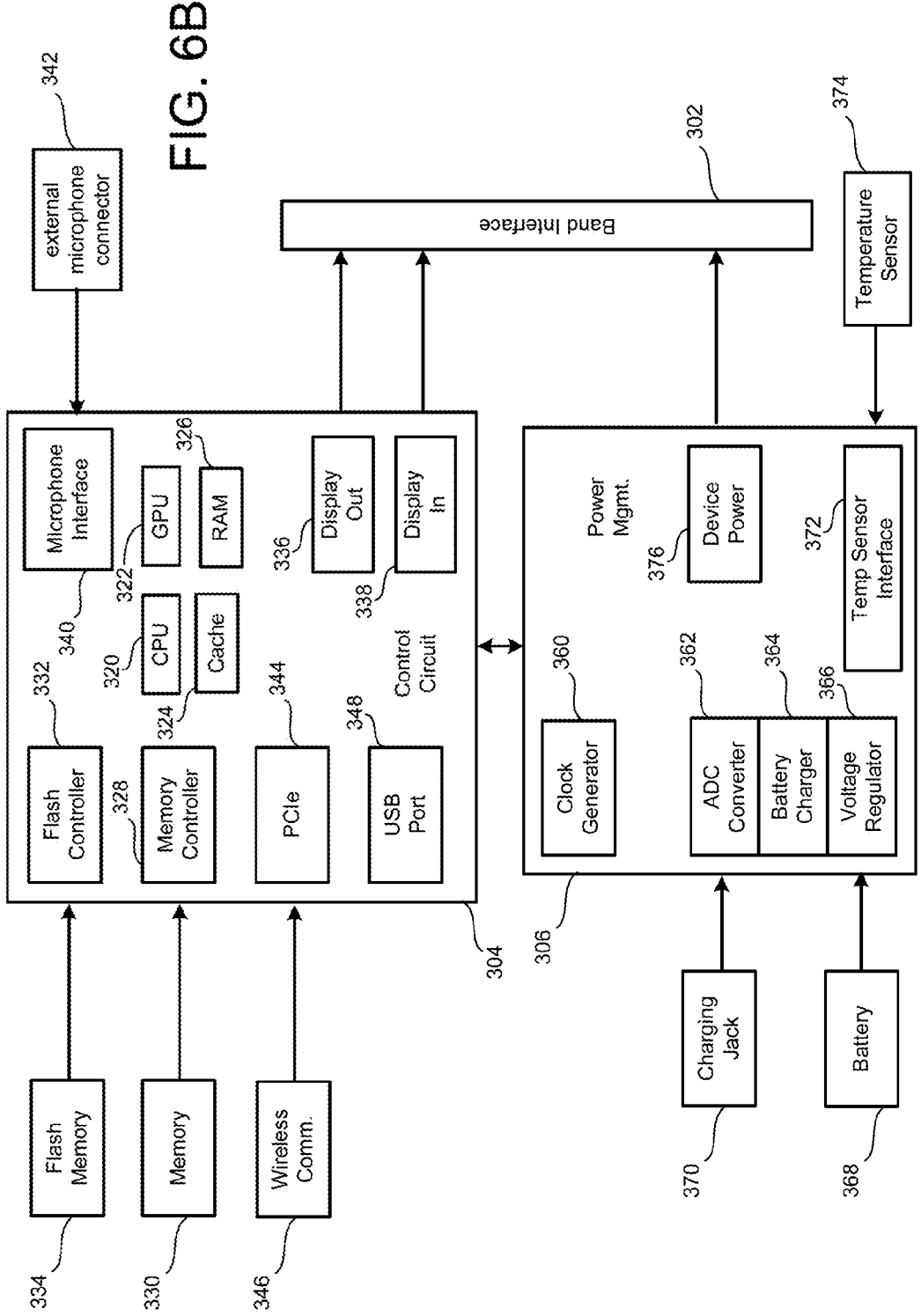

COLLABORATION ENVIRONMENT USING SEE THROUGH DISPLAYS

BACKGROUND

Augmented reality is a technology that allows virtual imagery to be mixed with a real world physical environment. For example, an augmented reality system can be used to insert virtual images before the eyes of a user. In many cases, augmented reality systems do not present a view of the real world beyond the virtual images presented.

A number of different types of collaboration systems exist for business users. A basic collaboration system allows users to share information and tracks user changes to the information. It may also include permissions regulating who has access to information and what actions they can take on the information.

SUMMARY

Technology is described herein which provides various embodiments for implementing an augmented reality system using a mixed virtual and real world collaboration environment for users. The technology includes a see-through, near-eye, mixed reality display device for collaboration amongst various users of other such devices and personal audio/visual devices of more limited capabilities. One or more wearers of a see through head mounted display apparatus define a collaboration environment. A three dimensional location, orientation and gaze of the apparatus are determined, as well as the three dimensional location of at one or more users in the field of view of the wearer through the see-through display. This determination can be made using one or more sensors on the display apparatus. For the collaboration environment, a selection of collaboration data and the scope of the environment are determined. Virtual representations of the collaboration data in the field of view of the wearer, and other device users are rendered. Persons in the wearer's field of view to be included in collaboration environment and who are entitled to share information in the collaboration environment are defined by the wearer. If allowed, input from other users in the collaboration environment on the virtual object may be received and allowed to manipulate a change in the virtual object. This manipulation may be displayed to the wearer and other users.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3A is a flowchart of a method embodiment for aligning a see-through, near-eye, mixed reality display with an IPD.

FIG. 3B is a flowchart of an implementation example of a method for adjusting a display device for bringing the device into alignment with a user IPD.

FIG. 3C is a flowchart illustrating different example options of mechanical or automatic adjustment of at least one display adjustment mechanism.

FIG. 4A is a side view of an eyeglass temple in an eyeglasses embodiment of a mixed reality display device providing support for hardware and software components.

FIG. 4B is a side view of an eyeglass temple in an embodiment of a mixed reality display device providing support for hardware and software components and three dimensional adjustment of a microdisplay assembly.

FIG. 5A is a top view of an embodiment of a movable display optical system of a see-through, near-eye, mixed reality device including an arrangement of gaze detection elements.

FIG. 5B is a top view of another embodiment of a movable display optical system of a see-through, near-eye, mixed reality device including an arrangement of gaze detection elements.

FIG. 5C is a top view of a third embodiment of a movable display optical system of a see-through, near-eye, mixed reality device including an arrangement of gaze detection elements.

FIG. 5D is a top view of a fourth embodiment of a movable display optical system of a see-through, near-eye, mixed reality device including an arrangement of gaze detection elements.

FIG. 6B is a block diagram of one embodiment of the hardware and software components of a processing unit associated with a see-through, near-eye, mixed reality display unit.

DETAILED DESCRIPTION

Figure 1A:
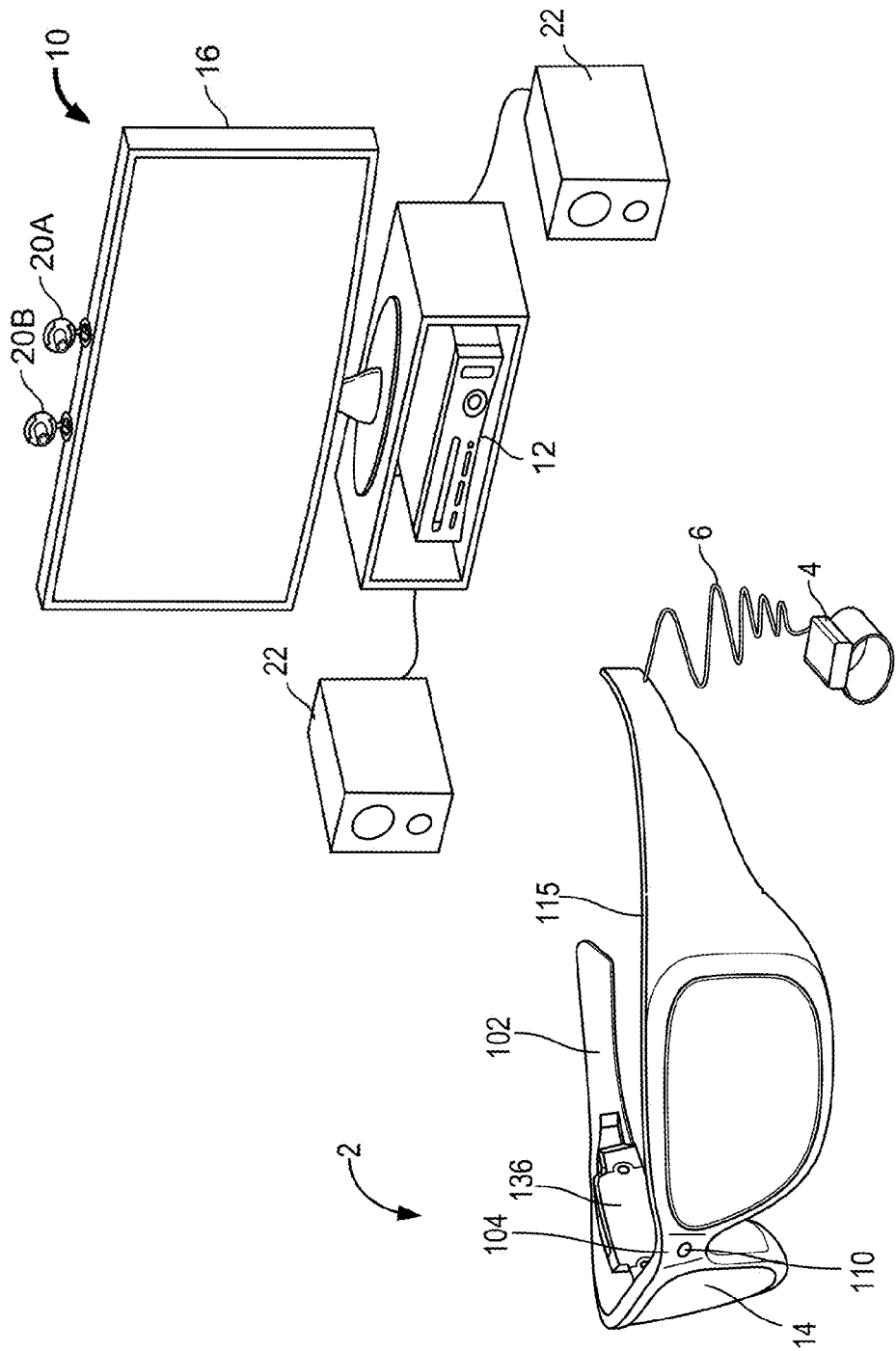
FIG. 1A is a block diagram depicting example components of one embodiment of a see-through, mixed reality display device with adjustable IPD in a system environment in which the device may operate.

The technology described herein includes a see-through, near-eye, mixed reality display device for collaboration amongst various users of other such devices and personal audio/visual devices of more limited capabilities. One or more wearers of a see through head mounted display apparatus define a collaboration environment. A three dimensional location, orientation and gaze of the apparatus are determined, as well as the three dimensional location of at one or more users in the field of view of the wearer through the see-through display. This determination can be made using one or more sensors on the display apparatus. For the collaboration environment, a selection of collaboration data and the scope of the environment are determined. Virtual representations of the collaboration data in the field of view of the wearer, and other device users are rendered. Persons in the wearer's field of view to be included in collaboration environment and who are entitled to share information in the collaboration environment are defined by the wearer. If allowed, input from other users in the collaboration environment on the virtual object may be received and allowed to manipulate a change in the virtual object. This manipulation may be displayed to the wearer and other users.

The technology provides an augmented view of real-time shared information. Each see through head mounted display provides a user specific experience and reactions to presentations in a collaborative environment combining virtual and physical objects. One user can manipulate the collaborative workspace of shared content objects, real or virtual, using in-person collaboration around an object, with other device users receiving the same experience, a view that the sharer wants them to see, or their own user-controlled view. Controls for the view can be "virtually generated" by the devices. This can include real-time translation of shared items (such as white boarded drawings; two dimensional drawings/plans; generation of three dimensional objects). The shared experience can include overlays on views of real objects or presentation of virtual object, in the same room or in physically separate locations.

The collaboration experience can be extended between see though head mounted displays and other types of hardware devices. One or more people wearing see though head mounted displays in a collaborative environment can communicate the collaborative experience of the see though head mounted display with others who do not have the see though head mounted display hardware. Users of the non-see though head mounted display hardware see the same relative view of the shared environment and virtual objects that the see though head mounted display wearers have.

Users in the collaboration environment may have different collaboration permissions. These permissions can be visualized relative to individuals (and objects) in a common physical environment. User identity can be tied to levels of access to shared content. User identification can alert wearers to prevent disclosure of confidential information to individuals not authorized to receive the information.

Views of shared content can be different for different levels of users. Presentation of a shared calendar for a development team and a marketing team may be different when commonly presented to both groups in a shared environment such as a meeting. Types of shared info based on permissions include shared information in meetings as well as social information. Visualizations can include sharing information links between users and user devices.

Users in the collaboration environment may be identified by a number of methods. These include specific registration of users, identification by reference to associated devices, and biometric methods of authentication to access collaboration permissions.

Wearers may be allowed to control the use of see though head mounted displays by preventing third party access or access at specific times or to specific features. For example, turning off location sharing generally or to specific third parties; preventing access during business hours. Fleet management of see though head mounted displays includes permissions for shared experience by business users, parental controls for minors, or any environment where a master administrator controls user of functions of the see though head mounted display. For example, an administrator may block applications or use of particular functions making the device more suitable for limited applications of a business.

FIG. 1A is a block diagram depicting example components of one embodiment of a see-through, mixed reality display device in a system environment in which the device may operate. System 10 includes a see-through display device as a near-eye, head mounted display device 2 in communication with processing unit 4 via wire 6. In other embodiments, head mounted display device 2 communicates with processing unit 4 via wireless communication. Processing unit 4 may take various embodiments. In some embodiments, processing unit 4 is a separate unit which may be worn on the user's body, e.g. the wrist in the illustrated example or in a pocket, and includes much of the computing power used to operate near-eye display device 2.

Processing unit 4 may communicate wirelessly (e.g., WiFi, Bluetooth, infra-red, or other wireless communication means) to one or more hub computing systems 12, hot spots, cellular data networks, etc. In other embodiments, the functionality of the processing unit 4 may be integrated in software and hardware components of the display device 2.

See through head mounted display device 2, which in one embodiment is in the shape of eyeglasses in a frame 115, is worn on the head of a user so that the user can see through a display, embodied in this example as a display optical system 14 for each eye, and thereby have an actual direct view of the space in front of the user. The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, on the display that are viewable by the person wearing the see-through display device while that person is also viewing real world objects through the display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor, hat, helmet or goggles. The frame 115 includes a temple or side arm for resting on each of a user's ears. Temple 102 is representative of an embodiment of the right temple and includes control circuitry 136 for the display device 2. Nose bridge 104 of the frame includes a microphone 110 for recording sounds and transmitting audio data to processing unit 4.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. An application may be executing on hub computing system 12, the display device 2, as discussed below on a mobile device 5 or a combination of these.

In one embodiment, the hub computing system 12 further includes one or more capture devices, such as capture devices 20A and 20B. The two capture devices can be used to capture the room or other physical environment of the user but are not necessary for use with see through head mounted display device 2 in all embodiments.

Capture devices 20A and 20B may be, for example, cameras that visually monitor one or more users and the surrounding space such that gestures and/or movements performed by the one or more users, as well as the structure of the surrounding space, may be captured, analyzed, and tracked to perform one or more controls or actions within an application and/or animate an avatar or on-screen character.

Hub computing system 12 may be connected to an audiovisual device 16 such as a television, a monitor, a high-definition television (HDTV), or the like that may provide game or application visuals. In some instances, the audiovisual device 16 may be a three-dimensional display device. In one example, audiovisual device 16 includes internal speakers. In other embodiments, audiovisual device 16, a separate stereo or hub computing system 12 is connected to external speakers 22.

Note that display device 2 and processing unit 4 can be used without Hub computing system 12, in which case processing unit 4 will communicate with a WiFi network, a cellular network or other communication means.

Figure 1B:
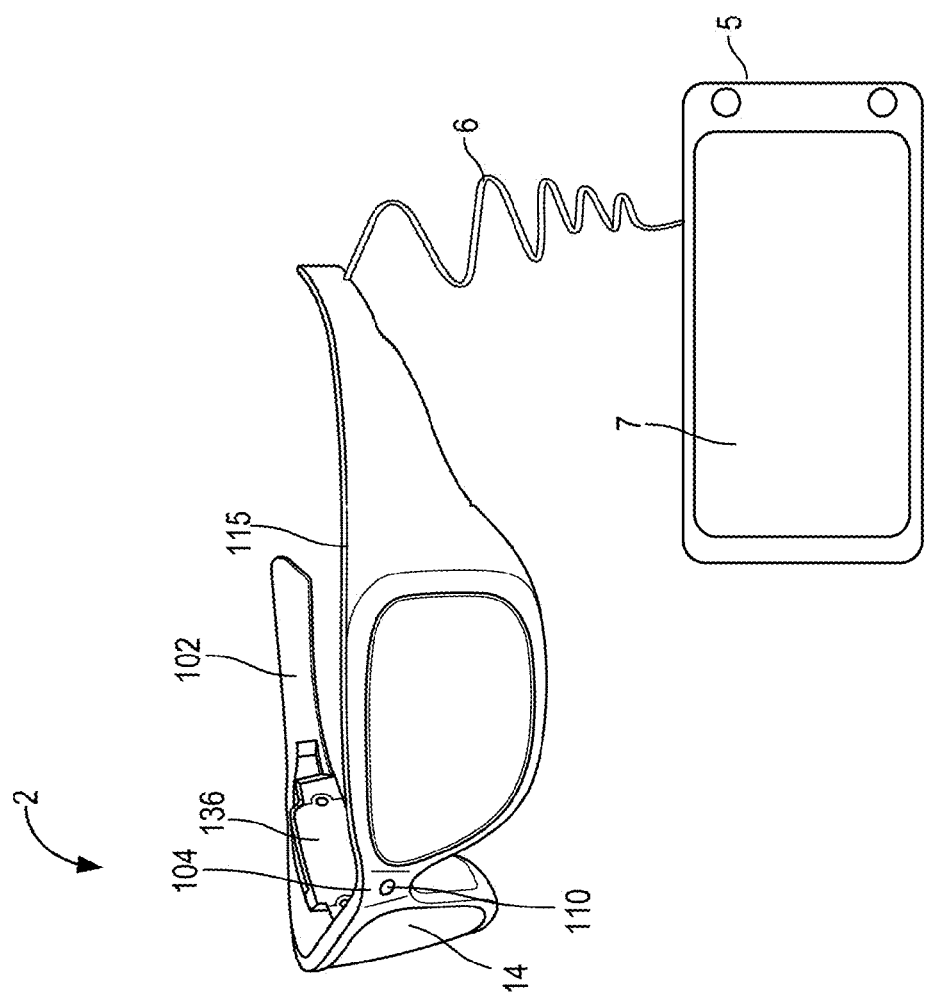
FIG. 1B is a block diagram depicting example components of another embodiment of a see-through, mixed reality display device with adjustable IPD.

FIG. 1B is a block diagram depicting example components of another embodiment of a see-through, mixed reality display device. In this embodiment, the near-eye display device 2 communicates with a mobile computing device 5 as an example embodiment of the processing unit 4. In the illustrated example, the mobile device 5 communicates via wire 6, but communication may also be wireless in other examples.

Furthermore, as in the hub computing system 12, gaming and non-gaming applications may execute on a processor of the mobile device 5 which user actions control or which user actions animate an avatar as may be displayed on a display 7 of the device 5. The mobile device 5 also provides a network interface for communicating with other computing devices like hub computing system 12 over the Internet or via another communication network via a wired or wireless communication medium using a wired or wireless communication protocol. A remote network accessible computer system like hub computing system 12 may be leveraged for processing power and remote data access by a processing unit 4 like mobile device 5. Examples of hardware and software components of a mobile device 5 such as may be embodied in a smartphone or tablet computing device are described in FIG. 20, and these components can embody the hardware and software components of a processing unit 4 such as those discussed in the embodiment of FIG. 7A. Some other examples of mobile devices 5 are a laptop or notebook computer and a netbook computer.

In some embodiments, gaze detection of each of a user's eyes is based on a three dimensional coordinate system of gaze detection elements on a near-eye, mixed reality display device like the eyeglasses 2 in relation to one or more human eye elements such as a cornea center, a center of eyeball rotation and a pupil center. Examples of gaze detection elements which may be part of the coordinate system including glint generating illuminators and at least one sensor for capturing data representing the generated glints. As discussed below (see FIG. 16 discussion), a center of the cornea can be determined based on two glints using planar geometry. The center of the cornea links the pupil center and the center of rotation of the eyeball, which may be treated as a fixed location for determining an optical axis of the user's eye at a certain gaze or viewing angle.

Figure 2A:
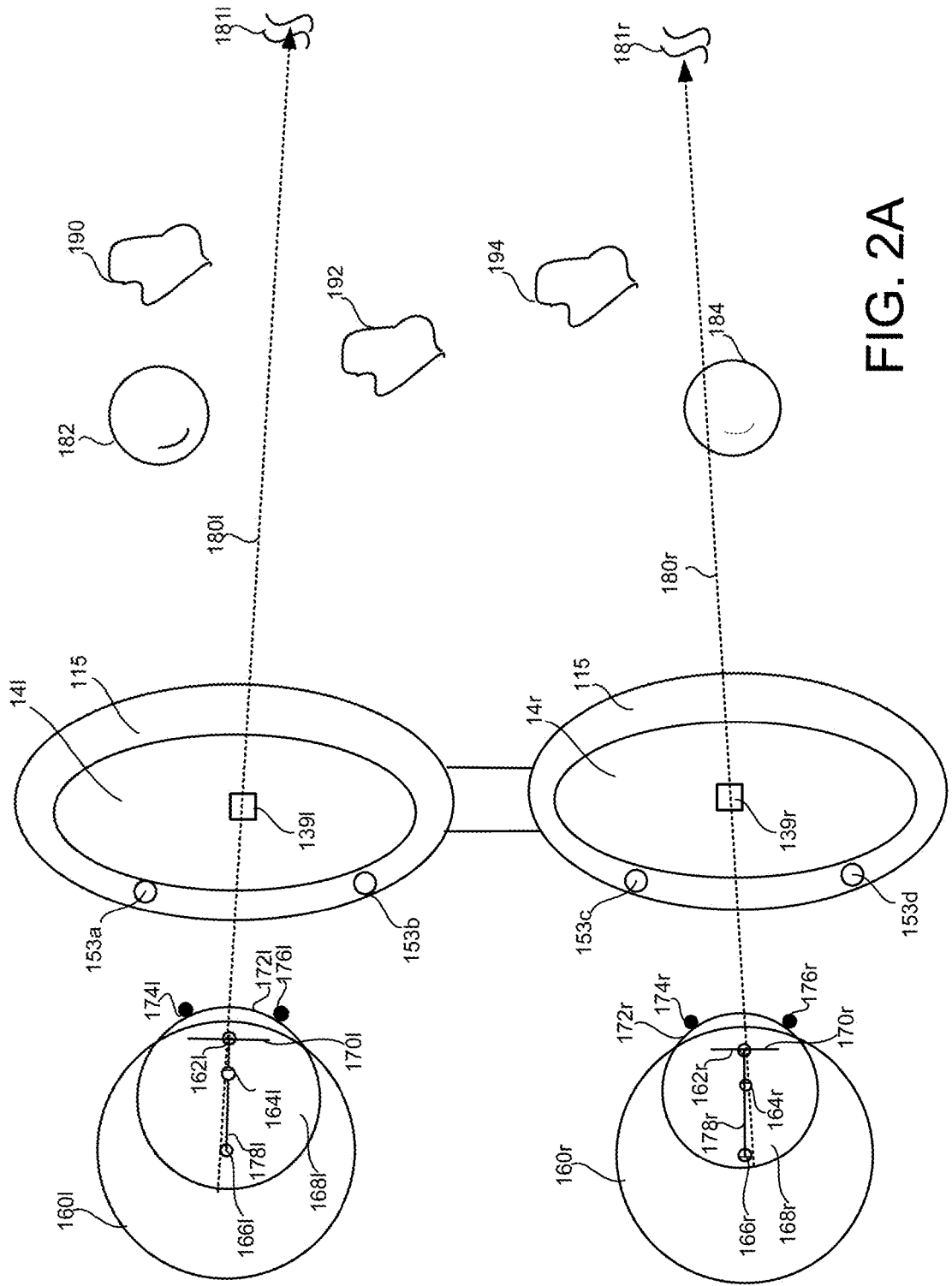
FIG. 2A is a top view illustrating examples of gaze vectors extending to a point of gaze at a distance and a direction for aligning a far IPD.

FIG. 2A is a top view illustrating examples of gaze vectors extending to a point of gaze at a distance and direction for aligning a far inter-pupillary distance (IPD). FIG. 2A illustrates examples of gaze vectors intersecting at a point of gaze where a user's eyes are focused effectively at infinity, for example beyond five (5) feet, or, in other words, examples of gaze vectors when the user is looking straight ahead. A model of the eyeball 160*l*, 160*r* is illustrated for each eye based on the Gullstrand schematic eye model. For each eye, an eyeball 160 is modeled as a sphere with a center of rotation 166 and includes a cornea 168 modeled as a sphere too and having a center 164. The cornea rotates with the eyeball, and the center 166 of rotation of the eyeball may be treated as a fixed point. The cornea covers an iris 170 with a pupil 162 at its center. In this example, on the surface 172 of the respective cornea are glints 174 and 176.

In the illustrated embodiment of FIG. 2A, a sensor detection area 139 (139*l* and 139*r*) is aligned with the optical axis of each display optical system 14 within an eyeglass frame 115. The sensor associated with the detection area is a camera in this example capable of capturing image data representing glints 174*l* and 176*l* generated respectively by illuminators 153*a* and 153*b* on the left side of the frame 115 and data representing glints 174*r* and 176*r* generated respectively by illuminators 153*c* and 153*d*. Through the display optical systems, 14*l* and 14*r* in the eyeglass frame 115, the user's field of view includes both real objects 190, 192 and 194 and virtual objects 182, 184, and 186.

The axis 178 formed from the center of rotation 166 through the cornea center 164 to the pupil 162 is the optical axis of the eye. A gaze vector 180 is sometimes referred to as the line of sight or visual axis which extends from the fovea through the center of the pupil 162. The fovea is a small area of about 1.2 degrees located in the retina. The angular offset between the optical axis computed and the visual axis has horizontal and vertical components. The horizontal component is up to 5 degrees from the optical axis, and the vertical component is between 2 and 3 degrees. In many embodiments, the optical axis is determined and a small correction is determined through user calibration to obtain the visual axis which is selected as the gaze vector.

For each user, a virtual object may be displayed by the display device at each of a number of predetermined positions at different horizontal and vertical positions. An optical axis may be computed for each eye during display of the object at each position, and a ray modeled as extending from the position into the user eye. A gaze offset angle with horizontal and vertical components may be determined based on how the optical axis must be moved to align with the modeled ray. From the different positions, an average gaze offset angle with horizontal or vertical components can be selected as the small correction to be applied to each computed optical axis. In some embodiments, only a horizontal component is used for the gaze offset angle correction.

The visual axes 180l and 180r illustrate that the gaze vectors are not perfectly parallel as the vectors become closer together as they extend from the eyeball into the field of view at a point of gaze which is effectively at infinity as indicated by the symbols 181l and 181r. At each display optical system 14, the gaze vector 180 appears to intersect the optical axis upon which the sensor detection area 139 is centered. In this configuration, the optical axes are aligned with the interpupillary distance (IPD). When a user is looking straight ahead, the IPD measured is also referred to as the far IPD.

When identifying an object for a user to focus on for aligning IPD at a distance, the object may be aligned in a direction along each optical axis of each display optical system. Initially, the alignment between the optical axis and user's pupil is not known. For a far IPD, the direction may be straight ahead through the optical axis. When aligning near IPD, the identified object may be in a direction through the optical axis, however due to vergence of the eyes necessary for close distances, the direction is not straight ahead although it may be centered between the optical axes of the display optical systems.

Figure 2B:
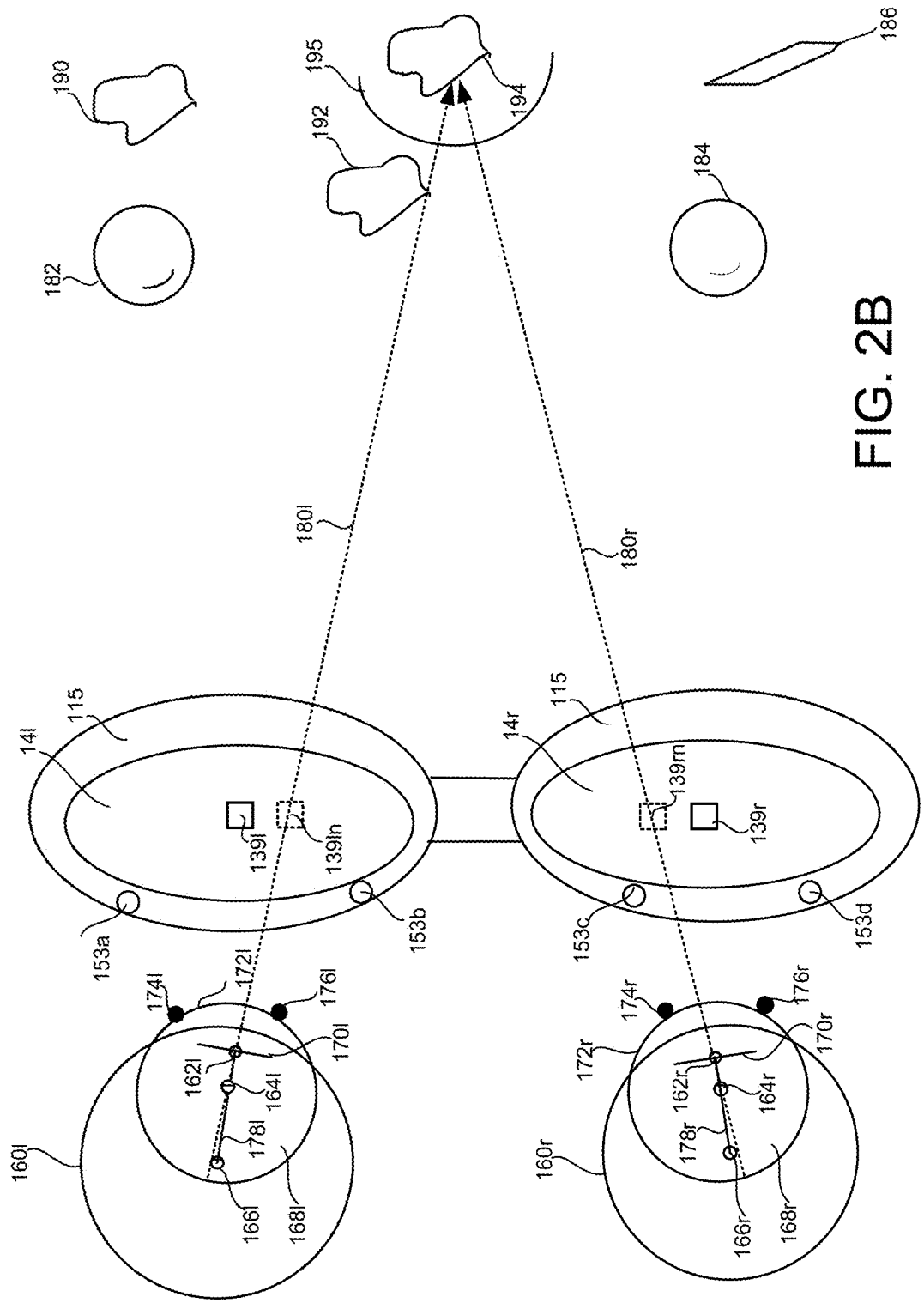
FIG. 2B is a top view illustrating examples of gaze vectors extending to a point of gaze at a distance and a direction for aligning a near IPD.

FIG. 2B is a top view illustrating examples of gaze vectors extending to a point of gaze at a distance and a direction for aligning a near IPD. In this example, the cornea 168l of the left eye is rotated to the right or towards the user's nose, and the cornea 168r of the right eye is rotated to the left or towards the user's nose. Both pupils are gazing at a real object 194 at a much closer distance, for example two (2) feet in front of the user. Gaze vectors 180l and 180r from each eye enter the Panum's fusional region 195 in which real object 194 is located. The Panum's fusional region is the area of single vision in a binocular viewing system like that of human vision. The intersection of the gaze vectors 180l and 180r indicates that the user is looking at real object 194. At such a distance, as the eyeballs rotate inward, the distance between their pupils decreases to a near IPD. The near IPD is typically about 4 mm less than the far IPD. A near IPD distance criteria, e.g. a point of gaze at less than four feet for example, may be used to switch or adjust the IPD alignment of the display optical systems 14 to that of the near IPD. For the near IPD, each display optical system 14 may be moved toward the user's nose so the optical axis, and detection area 139, moves toward the nose a few millimeters as represented by detection areas 139ln and 139rn.

Techniques for automatically determining a user's IPD and automatically adjusting the see though head mounted display to set the IPD for optimal user viewing, are discussed in co-pending U.S. patent application Ser. No. 13/221,739 entitled Gaze Detection In A See-Through, Near-Eye, Mixed Reality Display; U.S. patent application Ser. No. 13/221,707 entitled Adjustment Of A Mixed Reality Display For Inter-Pupillary Distance Alignment; and U.S. patent application Ser. No. 13/221,662 entitled Aligning Inter-Pupillary Distance In A Near-Eye Display System, all of which are hereby incorporated specifically by reference.

In general, FIG. 3A shows is a flowchart of a method embodiment 300 for aligning a see-through, near-eye, mixed reality display with an IPD. In step 301, one or more processors of the control circuitry 136, e.g. processor 210 in FIG. 7A below, the processing unit 4, 5, the hub computing system 12 or a combination of these automatically determines whether a see-through, near-eye, mixed reality display device is aligned with an IPD of a user in accordance with an alignment criteria. If not, in step 302, the one or more processors cause adjustment of the display device by at least one display adjustment mechanism for bringing the device into alignment with the user IPD. If it is determined the see-through, near-eye, mixed reality display device is in alignment with a user IPD, optionally, in step 303 an IPD data set is stored for the user. In some embodiments, a display device 2 may automatically determine whether there is IPD alignment every time anyone puts on the display device 2. However, as IPD data is generally fixed for adults, due to the confines of the human skull, an IPD data set may be determined typically once and stored for each user. The stored IPD data set may at least be used as an initial setting for a display device with which to begin an IPD alignment check.

FIG. 3B is a flowchart of an implementation example of a method for adjusting a display device for bringing the device into alignment with a user IPD. In this method, at least one display adjustment mechanism adjusts the position of a at least one display optical system 14 which is misaligned. In step 407, one or more adjustment are automatically determined for the at least one display adjustment mechanism for satisfying the alignment criteria for at least one display optical system. In step 408, that at least one display optical system is adjusted based on the one or more adjustment values. The adjustment may be performed automatically under the control of a processor or mechanically as discussed further below.

FIG. 3C is a flowchart illustrating different example options of mechanical or automatic adjustment by the at least one display adjustment mechanism as may be used to implement step 408. Depending on the configuration of the display adjustment mechanism in the display device 2, from step 407 in which the one or more adjustment values were already determined, the display adjustment mechanism may either automatically, meaning under the control of a processor, adjust the at least one display adjustment mechanism in accordance with the one or more adjustment values in step 334. Alternatively, one or more processors associated with the system, e.g. a processor in processing unit 4,5, processor 210 in the control circuitry 136, or even a processor of hub computing system 12 may electronically provide instructions as per step 333 for user application of the one or more adjustment values to the at least one display adjustment mechanism. There may be instances of a combination of automatic and mechanical adjustment under instructions.

Some examples of electronically provided instructions are instructions displayed by the microdisplay 120, the mobile device 5 or on a display 16 by the hub computing system 12 or audio instructions through speakers 130 of the display device 2. There may be device configurations with an automatic adjustment and a mechanical mechanism depending on user preference or for allowing a user some additional control.

FIG. 4A illustrates an exemplary arrangement of a see through, near-eye, mixed reality display device embodied as eyeglasses with movable display optical systems including gaze detection elements. What appears as a lens for each eye represents a display optical system 14 for each eye, e.g. 14r and 14*l*. A display optical system includes a see-through lens, e.g. 118 and 116 in FIGS. 5A-5*b*, as in an ordinary pair of glasses, but also contains optical elements (e.g. mirrors, filters) for seamlessly fusing virtual content with the actual direct real world view seen through the lenses 118, 116. A display optical system 14 has an optical axis which is generally in the center of the see-through lens 118, 116 in which light is generally collimated to provide a distortionless view. For example, when an eye care professional fits an ordinary pair of eyeglasses to a user's face, a goal is that the glasses sit on the user's nose at a position where each pupil is aligned with the center or optical axis of the respective lens resulting in generally collimated light reaching the user's eye for a clear or distortionless view.

In an exemplary device 2, a detection area of at least one sensor is aligned with the optical axis of its respective display optical system so that the center of the detection area is capturing light along the optical axis. If the display optical system is aligned with the user's pupil, each detection area of the respective sensor is aligned with the user's pupil. Reflected light of the detection area is transferred via one or more optical elements to the actual image sensor of the camerain this example illustrated by dashed line as being inside the frame 115.

In one example, a visible light camera (also commonly referred to as an RGB camera) may be the sensor. An example of an optical element or light directing element is a visible light reflecting mirror which is partially transmissive and partially reflective. The visible light camera provides image data of the pupil of the user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera is not sensitive to the virtual image reflections on the eye.

In other examples, the at least one sensor is an IR camera or a position sensitive detector (PSD) to which the IR radiation may be directed. For example, a hot reflecting surface may transmit visible light but reflect IR radiation. The IR radiation reflected from the eye may be from incident radiation of illuminators, other IR illuminators (not shown) or from ambient IR radiation reflected off the eye. In some examples, sensor may be a combination of an RGB and an IR camera, and the light directing elements may include a visible light reflecting or diverting element and an IR radiation reflecting or diverting element. In some examples, a camera may be small, e.g. 2 millimeters (mm) by 2 mm.

Various types of gaze detection systems are suitable for use in the present system. In some embodiments which calculate a cornea center as part of determining a gaze vector, two glints, and therefore two illuminators will suffice. However, other embodiments may use additional glints in determining a pupil position and hence a gaze vector. As eye data representing the glints is repeatedly captured, for example at 30 frames a second or greater, data for one glint may be blocked by an eyelid or even an eyelash, but data may be gathered by a glint generated by another illuminator.

FIG. 4A is a side view of an eyeglass temple 102 of the frame 115 in an eyeglasses embodiment of a see-through, mixed reality display device. At the front of frame 115 is physical environment facing video camera 113 that can capture video and still images. Particularly in some embodiments, physical environment facing camera 113 may be a depth camera as well as a visible light or RGB camera. For example, the depth camera may include an IR illuminator transmitter and a hot reflecting surface like a hot mirror in front of the visible image sensor which lets the visible light pass and directs reflected IR radiation within a wavelength range or about a predetermined wavelength transmitted by the illuminator to a CCD or other type of depth sensor. Other types of visible light camera (RGB camera) and depth cameras can be used. More information about depth cameras can be found in U.S. patent application Ser. No. 12/813,675, filed on Jun. 11, 2010, incorporated herein by reference in its entirety. The data from the sensors may be sent to a processor 210 of the control circuitry 136, or the processing unit 4, 5 or both which may process them but which the unit 4,5 may also send to a computer system over a network or hub computing system 12 for processing. The processing identifies objects through image segmentation and edge detection techniques and maps depth to the objects in the user's real world field of view. Additionally, the physical environment facing camera 113 may also include a light meter for measuring ambient light.

Control circuits 136 provide various electronics that support the other components of head mounted display device 2. More details of control circuits 136 are provided below with respect to FIGS. 6A and 6B. Inside, or mounted to temple 102, are ear phones 130, inertial sensors 132, GPS transceiver 144 and temperature sensor 138. In one embodiment inertial sensors 132 include a three axis magnetometer 132A, three axis gyro 132B and three axis accelerometer 132C (See FIG. 7A). The inertial sensors are for sensing position, orientation, and sudden accelerations of head mounted display device 2. From these movements, head position may also be determined.

The display device 2 provides an image generation unit which can create one or more images including one or more virtual objects. In some embodiments a microdisplay may be used as the image generation unit. A microdisplay assembly 173 in this example comprises light processing elements and a variable focus adjuster 135. An example of a light processing element is a microdisplay unit 120. Other examples include one or more optical elements such as one or more lenses of a lens system 122 and one or more reflecting elements such as surfaces 124*a* and 124*b* in FIGS. 6A and 6B or 124 in FIGS. 6C and 6D. Lens system 122 may comprise a single lens or a plurality of lenses.

Mounted to or inside temple 102, the microdisplay unit 120 includes an image source and generates an image of a virtual object. The microdisplay unit 120 is optically aligned with the lens system 122 and the reflecting surface 124 or reflecting surfaces 124*a* and 124*b* as illustrated in the following Figures. The optical alignment may be along an optical axis 133 or an optical path 133 including one or more optical axes. The microdisplay unit 120 projects the image of the virtual object through lens system 122, which may direct the image light, onto reflecting element 124 which directs the light into lightguide optical element 112 as in FIGS. 5C and 5D or onto reflecting surface 124*a* (e.g. a mirror or other surface) which directs the light of the virtual image to a partially reflecting element 124*b* which combines the virtual image view along path 133 with the natural or actual direct view along the optical axis 142 as in FIGS. 5A-5D. The combination of views are directed into a user's eye.

The variable focus adjuster 135 changes the displacement between one or more light processing elements in the optical path of the microdisplay assembly or an optical power of an element in the microdisplay assembly. The optical power of a lens is defined as the reciprocal of its focal length, e.g. 1/focal length, so a change in one effects the other. The change in focal length results in a change in the region of the field of view, e.g. a region at a certain distance, which is in focus for an image generated by the microdisplay assembly 173.

In one example of the microdisplay assembly 173 making displacement changes, the displacement changes are guided within an armature 137 supporting at least one light processing element such as the lens system 122 and the microdisplay 120 in this example. The armature 137 helps stabilize the alignment along the optical path 133 during physical movement of the elements to achieve a selected displacement or optical power. In some examples, the adjuster 135 may move one or more optical elements such as a lens in lens system 122 within the armature 137. In other examples, the armature may have grooves or space in the area around a light processing element so it slides over the element, for example, microdisplay 120, without moving the light processing element. Another element in the armature such as the lens system 122 is attached so that the system 122 or a lens within slides or moves with the moving armature 137. The displacement range is typically on the order of a few millimeters (mm). In one example, the range is 1-2 mm. In other examples, the armature 137 may provide support to the lens system 122 for focal adjustment techniques involving adjustment of other physical parameters than displacement. An example of such a parameter is polarization.

For more information on adjusting a focal distance of a microdisplay assembly, see U.S. patent Ser. No. 12/941,825 entitled "Automatic Variable Virtual Focus for Augmented Reality Displays," filed Nov. 8, 2010, having inventors Avi Bar-Zeev and John Lewis and which is hereby incorporated by reference.

In one example, the adjuster 135 may be an actuator such as a piezoelectric motor. Other technologies for the actuator may also be used and some examples of such technologies are a voice coil formed of a coil and a permanent magnet, a magnetostriction element, and an electrostriction element.

There are different image generation technologies that can be used to implement microdisplay 120. For example, microdisplay 120 can be implemented using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the system described herein. Additionally, microdisplay 120 can be implemented using an emissive technology where light is generated by the display. For example, a PicoP™ engine from Microvision, Inc. emits a laser signal with a micro mirror steering either onto a tiny screen that acts as a transmissive element or beamed directly into the eye (e.g., laser).

FIG. 4B is a side view of an eyeglass temple in another embodiment of a mixed reality display device providing support for hardware and software components and three dimensional adjustment of a microdisplay assembly. Some of the numerals illustrated in the FIG. 5A above have been removed to avoid clutter in the drawing. In embodiments where the display optical system 14 is moved in any of three dimensions, the optical elements represented by reflecting surface 124 and the other elements of the microdisplay assembly 173, e.g. 120, 122 may also be moved for maintaining the optical path 133 of the light of a virtual image to the display optical system. An XYZ transport mechanism in this example made up of one or more motors represented by motor block 203 and shafts 205 under control of the processor 210 of control circuitry 136 (see FIG. 6A) control movement of the elements of the microdisplay assembly 173. An example of motors which may be used are piezoelectric motors. In the illustrated example, one motor is attached to the armature 137 and moves the variable focus adjuster 135 as well, and another representative motor 203 controls the movement of the reflecting element 124.

FIG. 5A is a top view of an embodiment of a movable display optical system 14 of a see-through, near-eye, mixed reality device 2 including an arrangement of gaze detection elements. A portion of the frame 115 of the near-eye display device 2 will surround a display optical system 14 and provides support for elements of an embodiment of a microdisplay assembly 173 including microdisplay 120 and its accompanying elements as illustrated. In order to show the components of the display system 14, in this case 14r for the right eye system, a top portion of the frame 115 surrounding the display optical system is not depicted. Additionally, the microphone 110 in bridge 104 is not shown in this view to focus attention on the operation of the display adjustment mechanism 203. As in the example of FIG. 4C, the display optical system 14 in this embodiment is moved by moving an inner frame 117r, which in this example surrounds the microdisplay assembly 173 as well. The display adjustment mechanism is embodied in this embodiment as three axis motors 203 which attach their shafts 205 to inner frame 117r to translate the display optical system 14, which in this embodiment includes the microdisplay assembly 173, in any of three dimensions as denoted by symbol 144 indicating three (3) axes of movement.

The display optical system 14 in this embodiment has an optical axis 142 and includes a see-through lens 118 allowing the user an actual direct view of the real world. In this example, the see-through lens 118 is a standard lens used in eye glasses and can be made to any prescription (including no prescription). In another embodiment, see-through lens 118 can be replaced by a variable prescription lens. In some embodiments, see-through, near-eye display device 2 will include additional lenses.

The display optical system 14 further comprises reflecting surfaces 124a and 124b. In this embodiment, light from the microdisplay 120 is directed along optical path 133 via a reflecting element 124a to a partially reflective element 124b embedded in lens 118 which combines the virtual object image view traveling along optical path 133 with the natural or actual direct view along the optical axis 142 so that the combined views are directed into a user's eye, right one in this example, at the optical axis, the position with the most collimated light for a clearest view.

A detection area of a light sensor is also part of the display optical system 14r. An optical element 125 embodies the detection area by capturing reflected light from the user's eye received along the optical axis 142 and directs the captured light to the sensor 134r, in this example positioned in the lens 118 within the inner frame 117r. As shown, the arrangement allows the detection area 139 of the sensor 134r to have its center aligned with the center of the display optical system 14. For example, if sensor 134r is an image sensor, sensor 134r captures the detection area 139, so an image captured at the image sensor is centered on the optical axis because the detection area 139 is. In one example, sensor 134r is a visible light camera or a combination of RGB/IR camera, and the optical element 125 includes an optical element which reflects visible light reflected from the user's eye, for example a partially reflective mirror.

In other embodiments, the sensor 134r is an IR sensitive device such as an IR camera, and the element 125 includes a hot reflecting surface which lets visible light pass through it and reflects IR radiation to the sensor 134r. An IR camera may capture not only glints, but also an infra-red or near infra-red image of the user's eye including the pupil.

In other embodiments, the IR sensor device 134r is a position sensitive device (PSD), sometimes referred to as an optical position sensor. The depiction of the light directing elements, in this case reflecting elements, 125, 124, 124a and 124b in FIGS. 5A-5D are representative of their functions. The elements may take any number of forms and be implemented with one or more optical components in one or more arrangements for directing light to its intended destination such as a camera sensor or a user's eye.

Figure 6A:
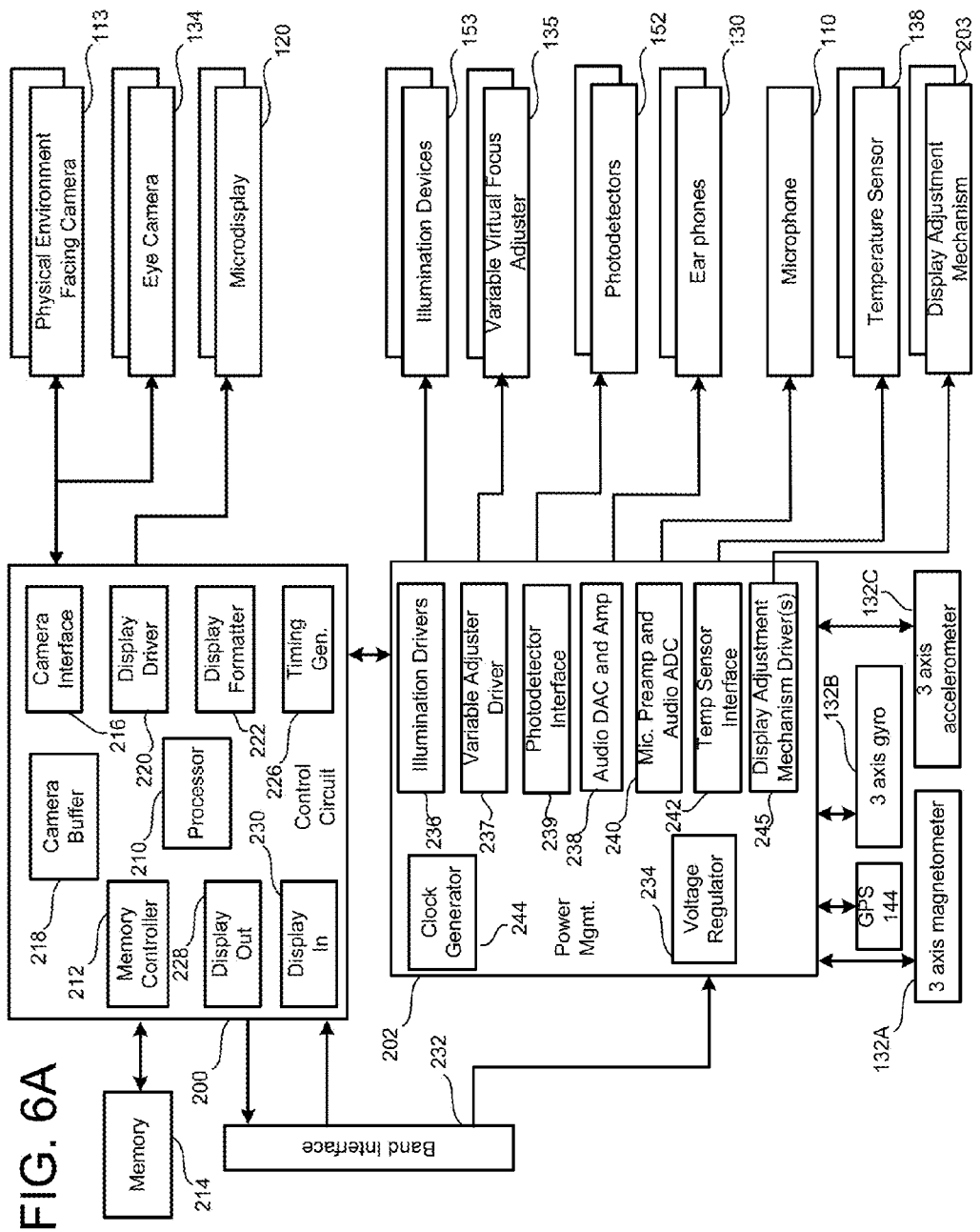
FIG. 6A is a block diagram of one embodiment of hardware and software components of a see-through, near-eye, mixed reality display unit as may be used with one or more embodiments.

As discussed in FIGS. 2A and 2B above and in the Figures below, when the user is looking straight ahead, and the center of the user's pupil is centered in an image captured of the user's eye when a detection area 139 or an image sensor 134r is effectively centered on the optical axis of the display, the display optical system 14r is aligned with the pupil. When both display optical systems 14 are aligned with their respective pupils, the distance between the optical centers matches or is aligned with the user's inter-pupillary distance. In the example of FIG. 6A, the inter-pupillary distance can be aligned with the display optical systems 14 in three dimensions.

In one embodiment, if the data captured by the sensor 134 indicates the pupil is not aligned with the optical axis, one or more processors in the processing unit 4, 5 or the control circuitry 136 or both use a mapping criteria which correlates a distance or length measurement unit to a pixel or other discrete unit or area of the image for determining how far off the center of the pupil is from the optical axis 142. Based on the distance determined, the one or more processors determine adjustments of how much distance and in which direction the display optical system 14r is to be moved to align the optical axis 142 with the pupil. Control signals are applied by one or more display adjustment mechanism drivers 245 to each of the components, e.g. motors 203, making up one or more display adjustment mechanisms 203. In the case of motors in this example, the motors move their shafts 205 to move the inner frame 117r in at least one direction indicated by the control signals. On the temple side of the inner frame 117r are flexible sections 215a, 215b of the frame 115 which are attached to the inner frame 117r at one end and slide within grooves 217a and 217b within the interior of the temple frame 115 to anchor the inner frame 117 to the frame 115 as the display optical system 14 is move in any of three directions for width, height or depth changes with respect to the respective pupil.

In addition to the sensor, the display optical system 14 includes other gaze detection elements. In this embodiment, attached to frame 117r on the sides of lens 118, are at least two (2) but may be more, infra-red (IR) illuminating devices 153 which direct narrow infra-red light beams within a particular wavelength range or about a predetermined wavelength at the user's eye to each generate a respective glint on a surface of the respective cornea. In other embodiments, the illuminators and any photodiodes may be on the lenses, for example at the corners or edges. In this embodiment, in addition to the at least 2 infra-red (IR) illuminating devices 153 are IR photodetectors 152. Each photodetector 152 is sensitive to IR radiation within the particular wavelength range of its corresponding IR illuminator 153 across the lens 118 and is positioned to detect a respective glint. As shown in FIGS. 4A-4C, the illuminator and photodetector are separated by a barrier 154 so that incident IR light from the illuminator 153 does not interfere with reflected IR light being received at the photodetector 152. In the case where the sensor 134 is an IR sensor, the photodetectors 152 may not be needed or may be an additional glint data capture source. With a visible light camera, the photodetectors 152 capture light from glints and generate glint intensity values.

In FIGS. 5A-5D, the positions of the gaze detection elements, e.g. the detection area 139 and the illuminators 153 and photodetectors 152 are fixed with respect to the optical axis of the display optical system 14. These elements may move with the display optical system 14r, and hence its optical axis, on the inner frame, but their spatial relationship to the optical axis 142 does not change.

FIG. 5B is a top view of another embodiment of a movable display optical system of a see-through, near-eye, mixed reality device including an arrangement of gaze detection elements. In this embodiment, light sensor 134r may be embodied as a visible light camera, sometimes referred to as an RGB camera, or it may be embodied as an IR camera or a camera capable of processing light in both the visible and IR ranges, e.g. a depth camera. In this example, the image sensor 134r is the detection area 139r. The image sensor 134 of the camera is located vertically on the optical axis 142 of the display optical system. In some examples, the camera may be located on frame 115 either above or below see-through lens 118 or embedded in the lens 118. In some embodiments, the illuminators 153 provide light for the camera, and in other embodiments the camera captures images with ambient lighting or light from its own light source. Image data captured may be used to determine alignment of the pupil with the optical axis. Gaze determination techniques based on image data, glint data or both may be used based on the geometry of the gaze detection elements.

In this example, the motor 203 in bridge 104 moves the display optical system 14r in a horizontal direction with respect to the user's eye as indicated by directional symbol 145. The flexible frame portions 215a and 215b slide within grooves 217a and 217b as the system 14 is moved. In this example, reflecting element 124a of an microdisplay assembly 173 embodiment is stationery. As the IPD is typically determined once and stored, any adjustment of the focal length between the microdisplay 120 and the reflecting element 124a that may be done may be accomplished by the microdisplay assembly, for example via adjustment of the microdisplay elements within the armature 137.

FIG. 5C is a top view of a third embodiment of a movable display optical system of a see-through, near-eye, mixed reality device including an arrangement of gaze detection elements. The display optical system 14 has a similar arrangement of gaze detection elements including IR illuminators 153 and photodetectors 152, and a light sensor 134r located on the frame 115 or lens 118 below or above optical axis 142. In this example, the display optical system 14 includes a light guide optical element 112 as the reflective element for directing the images into the user's eye and is situated between an additional see-through lens 116 and see-through lens 118. As reflecting element 124 is within the lightguide optical element and moves with the element 112, an embodiment of a microdisplay assembly 173 is attached on the temple 102 in this example to a display adjustment mechanism 203 for the display optical system 14 embodied as a set of three axis motor 203 with shafts 205 include at least one for moving the microdisplay assembly. One or more motors 203 on the bridge 104 are representative of the other components of the display adjustment mechanism 203 which provides three axes of movement 145. In another embodiment, the motors may operate to only move the devices via their attached shafts 205 in the horizontal direction. The motor 203 for the microdisplay assembly 173 would also move it horizontally for maintaining alignment between the light coming out of the microdisplay 120 and the reflecting element 124. A processor 210 of the control circuitry (see FIG. 7A) coordinates their movement.

Lightguide optical element 112 transmits light from microdisplay 120 to the eye of the user wearing head mounted display device 2. Lightguide optical element 112 also allows light from in front of the head mounted display device 2 to be transmitted through lightguide optical element 112 to the user's eye thereby allowing the user to have an actual direct view of the space in front of head mounted display device 2 in addition to receiving a virtual image from microdisplay 120. Thus, the walls of lightguide optical element 112 are see-through. Lightguide optical element 112 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar, substrate comprising lightguide optical element 112 by internal reflection.

After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye of the user. More details of a lightguide optical element can be found in United States Patent Application Publication 2008/0285140, Ser. No. 12/214,366, published on Nov. 20, 2008, "Substrate-Guided Optical Devices" incorporated herein by reference in its entirety. In one embodiment, each eye will have its own lightguide optical element 112.

FIG. 5D is a top view of a fourth embodiment of a movable display optical system of a see-through, near-eye, mixed reality device including an arrangement of gaze detection elements. This embodiment is similar to FIG. 5C's embodiment including a light guide optical element 112. However, the only light detectors are the IR photodetectors 152, so this embodiment relies on glint detection only for gaze detection as discussed in the examples below.

In the embodiments of FIGS. 5A-5D, the positions of the gaze detection elements, e.g. the detection area 139 and the illuminators 153 and photodetectors 152 are fixed with respect to each other. In these examples, they are also fixed in relation to the optical axis of the display optical system 14.

In the embodiments above, the specific number of lenses shown are just examples. Other numbers and configurations of lenses operating on the same principles may be used. Additionally, in the examples above, only the right side of the see-through, near-eye display 2 are shown. A full near-eye, mixed reality display device would include as examples another set of lenses 116 and/or 118, another lightguide optical element 112 for the embodiments of FIGS. 5C and 5D, another micro display 120, another lens system 122, likely another environment facing camera 113, another eye tracking camera 134 for the embodiments of FIGS. 6A to 6C, earphones 130, and a temperature sensor 138.

Figure 7B:
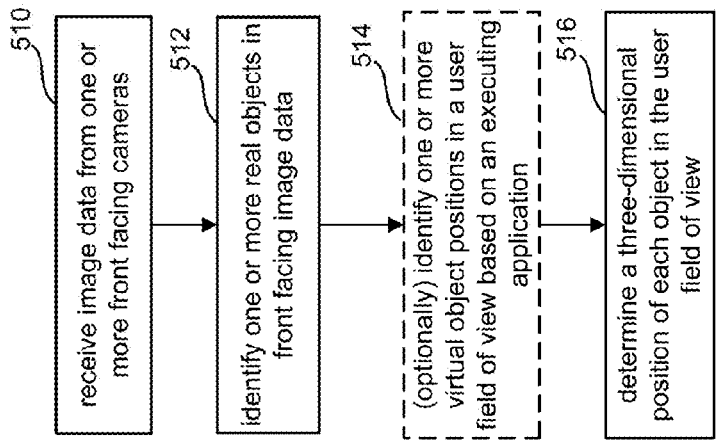
FIG. 7B is a flowchart of a method embodiment for determining a three-dimensional user field of view of a see-through, near-eye, mixed reality display device.
Figure 7A:
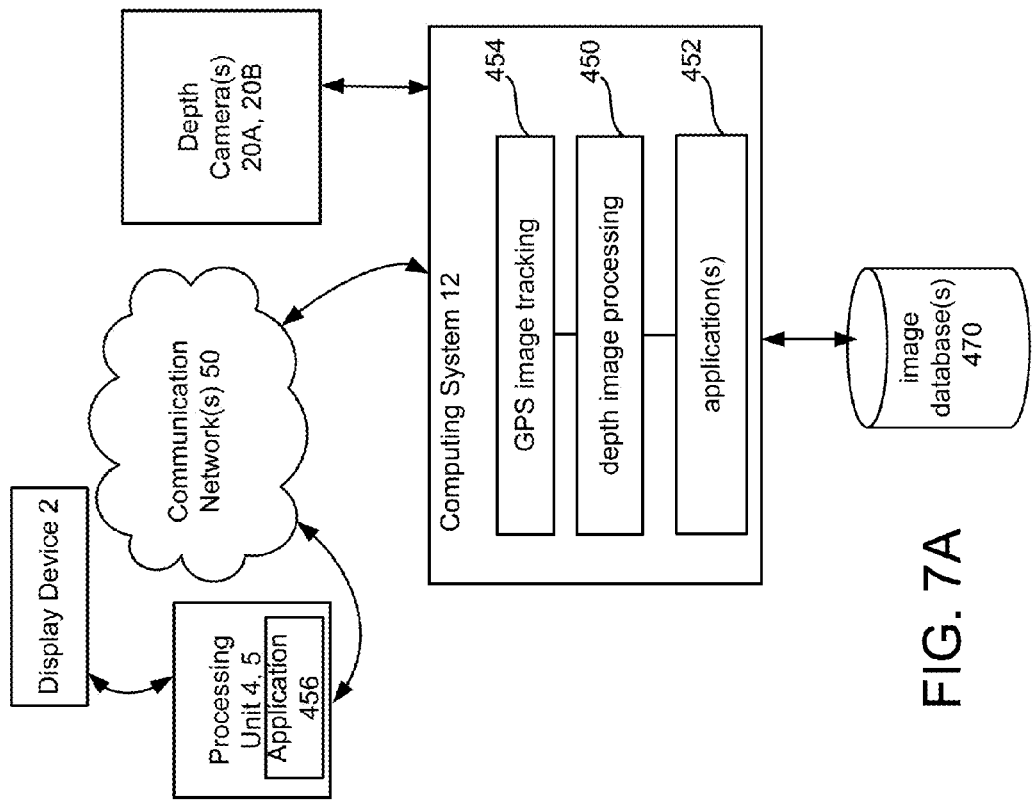
FIG. 7A is a block diagram of a system embodiment for determining positions of objects within a user field of view of a see-through, near-eye, mixed reality display device.

FIG. 6A is a block diagram of one embodiment of hardware and software components of a see-through, near-eye, mixed reality display unit 2 as may be used with one or more embodiments. FIG. 7B is a block diagram describing the various components of a processing unit 4, 5. In this embodiment, near-eye display device 2, receives instructions about a virtual image from processing unit 4, 5 and provides the sensor information back to processing unit 4, 5. Software and hardware components which may be embodied in a processing unit 4, 5 are depicted in FIG. 6B, will receive the sensory information from the display device 2 and may also receive sensory information from hub computing device 12 (See FIG. 1A). Based on that information, processing unit 4, 5 will determine where and when to provide a virtual image to the user and send instructions accordingly to the control circuitry 136 of the display device 2.

Note that some of the components of FIG. 6A (e.g., physical environment facing camera 113, eye camera 134, variable virtual focus adjuster 135, photodetector interface 139, micro display 120, illumination device 153 or illuminators, earphones 130, temperature sensor 138, display adjustment mechanism 203) are shown in shadow to indicate that there are at least two of each of those devices, at least one for the left side and at least one for the right side of head mounted display device 2. FIG. 6A shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230. In one embodiment, all of components of control circuit 220 are in communication with each other via dedicated lines of one or more buses. In another embodiment, each of the components of control circuit 200 are in communication with processor 210.

Camera interface 216 provides an interface to the two physical environment facing cameras 113 and each eye camera 134 and stores respective images received from the cameras 113, 134 in camera buffer 218. Display driver 220 will drive microdisplay 120. Display formatter 222 may provide information, about the virtual image being displayed on microdisplay 120 to one or more processors of one or more computer systems, e.g. 4, 5, 12, 210 performing processing for the augmented reality system. Timing generator 226 is used to provide timing data for the system. Display out 228 is a buffer for providing images from physical environment facing cameras 113 and the eye cameras 134 to the processing unit 4, 5. Display in 230 is a buffer for receiving images such as a virtual image to be displayed on microdisplay 120. Display out 228 and display in 230 communicate with band interface 232 which is an interface to processing unit 4, 5.

Power management circuit 202 includes voltage regulator 234, eye tracking illumination driver 236, variable adjuster driver 237, photodetector interface 239, audio DAC and amplifier 238, microphone preamplifier and audio ADC 240, temperature sensor interface 242, display adjustment mechanism driver(s) 245 and clock generator 244. Voltage regulator 234 receives power from processing unit 4, 5 via band interface 232 and provides that power to the other components of head mounted display device 2. Illumination driver 236 controls, for example via a drive current or voltage, the illumination devices 153 to operate about a predetermined wavelength or within a wavelength range. Audio DAC and amplifier 238 receives the audio information from earphones 130. Microphone preamplifier and audio ADC 240 provides an interface for microphone 110. Temperature sensor interface 242 is an interface for temperature sensor 138. One or more display adjustment drivers 245 provide control signals to one or more motors or other devices making up each display adjustment mechanism 203 which represent adjustment amounts of movement in at least one of three directions.

Power management unit 202 also provides power and receives data back from three axis magnetometer 132A, three axis gyro 132B and three axis accelerometer 132C. Power management unit 202 also provides power and receives data back from and sends data to GPS transceiver 144.

The variable adjuster driver 237 provides a control signal, for example a drive current or a drive voltage, to the adjuster 135 to move one or more elements of the microdisplay assembly 173 to achieve a displacement for a focal region calculated by software executing in a processor 210 of the control circuitry 13, or the processing unit 4,5 or the hub computer 12 or both. In embodiments of sweeping through a range of displacements and, hence, a range of focal regions, the variable adjuster driver 237 receives timing signals from the timing generator 226, or alternatively, the clock generator 244 to operate at a programmed rate or frequency.

The photodetector interface 239 performs any analog to digital conversion needed for voltage or current readings from each photodetector, stores the readings in a processor readable format in memory via the memory controller 212, and monitors the operation parameters of the photodetectors 152 such as temperature and wavelength accuracy.

FIG. 6B is a block diagram of one embodiment of the hardware and software components of a processing unit 4 associated with a see-through, near-eye, mixed reality display unit. The mobile device 5 may include this embodiment of hardware and software components as well as similar components which perform similar functions. FIG. 6B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with see-through, near-eye display device 2 via band interface 302 and band interface 232, display in buffer 338 in communication with near-eye display device 2 via band interface 302 and band interface 232, microphone interface 340 in communication with an external microphone connector 342 for connecting to a microphone, PCI express interface for connecting to a wireless communication device 346, and USB port(s) 348.

In one embodiment, wireless communication component 346 can include a Wi-Fi enabled communication device, Bluetooth communication device, infrared communication device, etc. The USB port can be used to dock the processing unit 4, 5 to hub computing device 12 in order to load data or software onto processing unit 4, 5, as well as charge processing unit 4, 5. In one embodiment, CPU 320 and GPU 322 are the main workhorses for determining where, when and how to insert images into the view of the user.

Power management circuit 306 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 2.

The Figures above provide examples of geometries of elements for a display optical system which provide a basis for different methods of aligning an IPD as discussed in the following Figures. The method embodiments may refer to elements of the systems and structures above for illustrative context; however, the method embodiments may operate in system or structural embodiments other than those described above.

The method embodiments below identify or provide one or more objects of focus for aligning an IPD. FIGS. 8A and 8B discuss some embodiments for determining positions of objects within a field of view of a user wearing the display device.

FIG. 7 is a block diagram of a system embodiment for determining positions of objects within a user field of view of a see-through, near-eye, mixed reality display device. This embodiment illustrates how the various devices may leverage networked computers to map a three-dimensional model of a user field of view and the real and virtual objects within the model. An application 456 executing in a processing unit 4,5 communicatively coupled to a display device 2 can communicate over one or more communication networks 50 with a computing system 12 for processing of image data to determine and track a user field of view in three dimensions. The computing system 12 may be executing an application 452 remotely for the processing unit 4,5 for providing images of one or more virtual objects. As mentioned above, in some embodiments, the software and hardware components of the processing unit are integrated into the display device 2. Either or both of the applications 456 and 452 working together may map a 3D model of space around the user. A depth image processing application 450 detects objects, identifies objects and their locations in the model. The application 450 may perform its processing based on depth image data from depth camera such as cameras 20A and 20B, two-dimensional or depth image data from one or more front facing cameras 113, and GPS metadata associated with objects in the image data obtained from a GPS image tracking application 454.

The GPS image tracking application 454 identifies images of the user's location in one or more image database(s) 470 based on GPS data received from the processing unit 4,5 or other GPS units identified as being within a vicinity of the user, or both. Additionally, the image database(s) may provide accessible images of a location with metadata like GPS data and identifying data uploaded by users who wish to share their images. The GPS image tracking application provides distances between objects in an image based on GPS data to the depth image processing application 450. Additionally, the application 456 may perform processing for mapping and locating objects in a 3D user space locally and may interact with the GPS image tracking application 454 for receiving distances between objects. Many combinations of shared processing are possible between the applications by leveraging network connectivity.

FIG. 7 is a flowchart of a method embodiment for determining a three-dimensional user field of view of a see-through, near-eye, mixed reality display device. In step 510, one or more processors of the control circuitry 136, the processing unit 4,5, the hub computing system 12 or a combination of these receive image data from one or more front facing cameras 113, and in step 512 identify one or more real objects in front facing image data. Based on the position of the front facing camera 113 or a front facing camera 113 for each display optical system, the image data from the front facing camera approximates the user field of view. The data from two cameras 113 may be aligned and offsets for the positions of the front facing cameras 113 with respect to the display optical axes accounted for. Data from the orientation sensor 132, e.g. the three axis accelerometer 132C and the three axis magnetometer 132A, can also be used with the front facing camera 113 image data for mapping what is around the user, the position of the user's face and head in order to determine which objects, real or virtual, he or she is likely focusing on at the time. Optionally, based on an executing application, the one or more processors in step 514 identify virtual object positions in a user field of view which may be determined to be the field of view captured in the front facing image data. In step 516, a three-dimensional position is determined for each object in the user field of view. In other words, where each object is located with respect to the display device 2, for example with respect to the optical axis 142 of each display optical system 14.

In some examples for identifying one or more real objects in the front facing image data, GPS data via a GPS unit, e.g. GPS unit 965 in the mobile device 5 or GPS transceiver 144 on the display device 2 may identify the location of the user. This location may be communicated over a network from the device 2 or via the processing unit 4,5 to a computer system 12 having access to a database of images 470 which may be accessed based on the GPS data. Based on pattern recognition of objects in the front facing image data and images of the location, the one or more processors determines a relative position of one or more objects in the front facing image data to one or more GPS tracked objects in the location. A position of the user from the one or more real objects is determined based on the one or more relative positions.

In other examples, each front facing camera is a depth camera providing depth image data or has a depth sensor for providing depth data which can be combined with image data to provide depth image data. The one or more processors of the control circuitry, e.g. 210, and the processing unit 4,5 identify one or more real objects including their three-dimensional positions in a user field of view based on the depth image data from the front facing cameras. Additionally, orientation sensor 132 data may also be used to refine which image data currently represents the user field of view. Additionally, a remote computer system 12 may also provide additional processing power to the other processors for identifying the objects and mapping the user field of view based on depth image data from the front facing image data.

In other examples, a user wearing the display device may be in an environment in which a computer system with depth cameras, like the example of the hub computing system 12 with depth cameras 20A and 20B in system 10 in FIG. 1A, maps in three-dimensions the environment or space and tracks real and virtual objects in the space based on the depth image data from its cameras and an executing application. For example, when a user enters a store, a store computer system may map the three-dimensional space. Depth images from multiple perspectives, include depth images from one or more display devices in some examples, may be combined by a depth image processing application 450 based on a common coordinate system for the space. Objects are detected, e.g. edge detection, in the space, and identified by pattern recognition techniques including facial recognition techniques with reference images of things and people from image databases. Such a system can send data such as the position of the user within the space and positions of objects around the user which the one or more processors of the device 2 and the processing unit 4,5 may use in detecting and identifying which objects are in the user field of view. Furthermore, the one or more processors of the display device 2 or the processing unit 4,5 may send the front facing image data and orientation data to the computer system 12 which performs the object detection, identification and object position tracking within the user field of view and sends updates to the processing unit 4,5.

Figure 8:
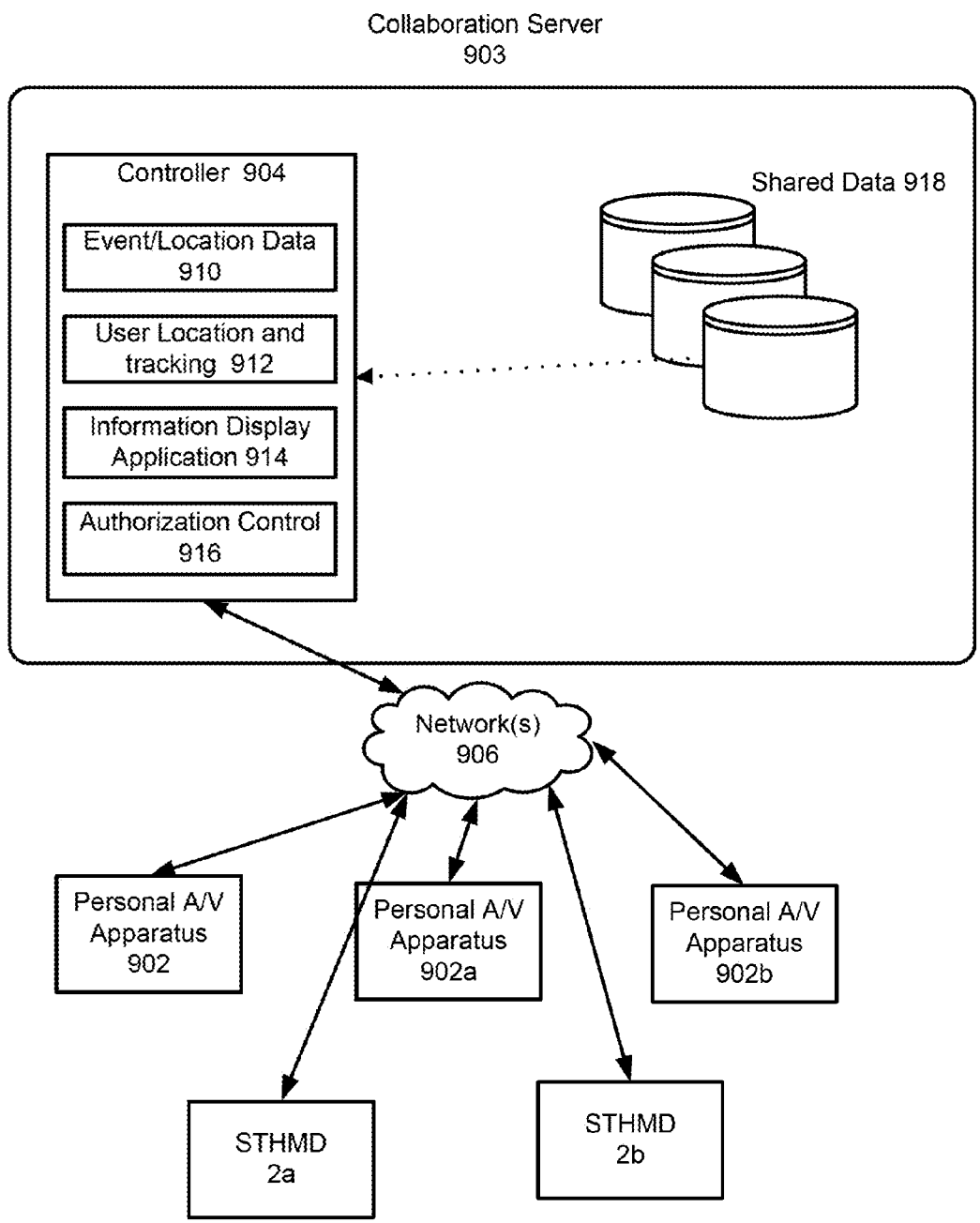
FIG. 8 is a block diagram of a system suitable for use with the present invention.

FIG. 8 shows a block diagram of a system suitable for implementing the present technology. As shown in FIG. 8, a collaboration server includes a controller 904 and shared data 918. The collaboration server 903 may comprise any one of the processing devices discussed herein including processing device 4, mobile device 5, computing system 12, or may comprise a cloud-computing service in which processes are performed by a plurality of servers executing shared processes. Controller 904 represents a series of computer programs and other functional elements or computers specifically programmed to perform the functions described below. In embodiments where the collaboration server is provided on a personal processing device, the devices may communicate directly with each other to enable a peer-to-peer collaboration using the processes and methods described herein.

The collaboration server 903 may provide collaboration data, transmit collaboration events between users, store user profile information used to provide collaboration intelligently, and/or may provide collaboration services which transmit events between the users. In order to implement a collaboration system, the collaboration server includes sharing data 918 which can be used for collaboration purposes. The controller 904 executes a series of functions including the event and location data tracking 910, user location tracking 912, information display applications 914, and authorization control 916. The collaboration data may comprise information that a user or presenter may wish to allow other users to view and/or interact with. Controller 904 includes event and location data tracking 910 which serves to provide functions for pre-arranged collaboration events and locations. User location and tracking module 912 keeps track of which particular users are in a particular collaboration environment, and communicates with the authorization control 916 to verify collaboration users at an event. The collaboration environment can comprise a workspace where, for example, a presenting user provides shared information and allows other users to interact collaboratively. It should be understood that a presenting user may also be a collaborating user and vice versa.

Each user in a collaboration system may utilize a personal audio-visual apparatus 902 which may comprise a see-through head-mounted display 2 or another type of device, including a mobile device 5, a hub processing system 12, or a personal computer. Users may be connected via networks 906 with the collaboration server 903. The information display application 914 can be utilized in conjunction with the processing systems of the audio-visual apparatus 902 as well as a see-through head-mounted display 2 to determine the position and nature of displays to the user. In one embodiment the display processing occurs at the collaboration server 903. In alternative embodiments, information is provided to the personal audio-visual apparatuses and the see-through head-mounted displays 2 and they determine which information should be displayed and where within the display. Various types of information display applications can be utilized in accordance with the present technology.

Authorization control 916 keeps track of which users are authorized to see varying levels of collaboration information. Collaboration information may be provided with any number of authorized levels of information granularity from fully accessible to partially accessible to not accessible at all. Authorization control alerts the presenting user to various levels of collaboration permissions of the users in the room. The controller 904 utilizes the authorization control 916, information display application 914, user location and tracking 912 and event and location data 910 to output information for use by different users in the collaboration environment. It also transmits events back and forth between users in the collaboration environment so that collaboration can incur intelligently.

It should be recognized that the collaboration environment is enacted with virtual and real-world objects. By using the combination of virtual and real-world objects, and allowing sharing and manipulation of both the virtual objects in the real world, a richer collaboration experience can be provided.

Figure 9:
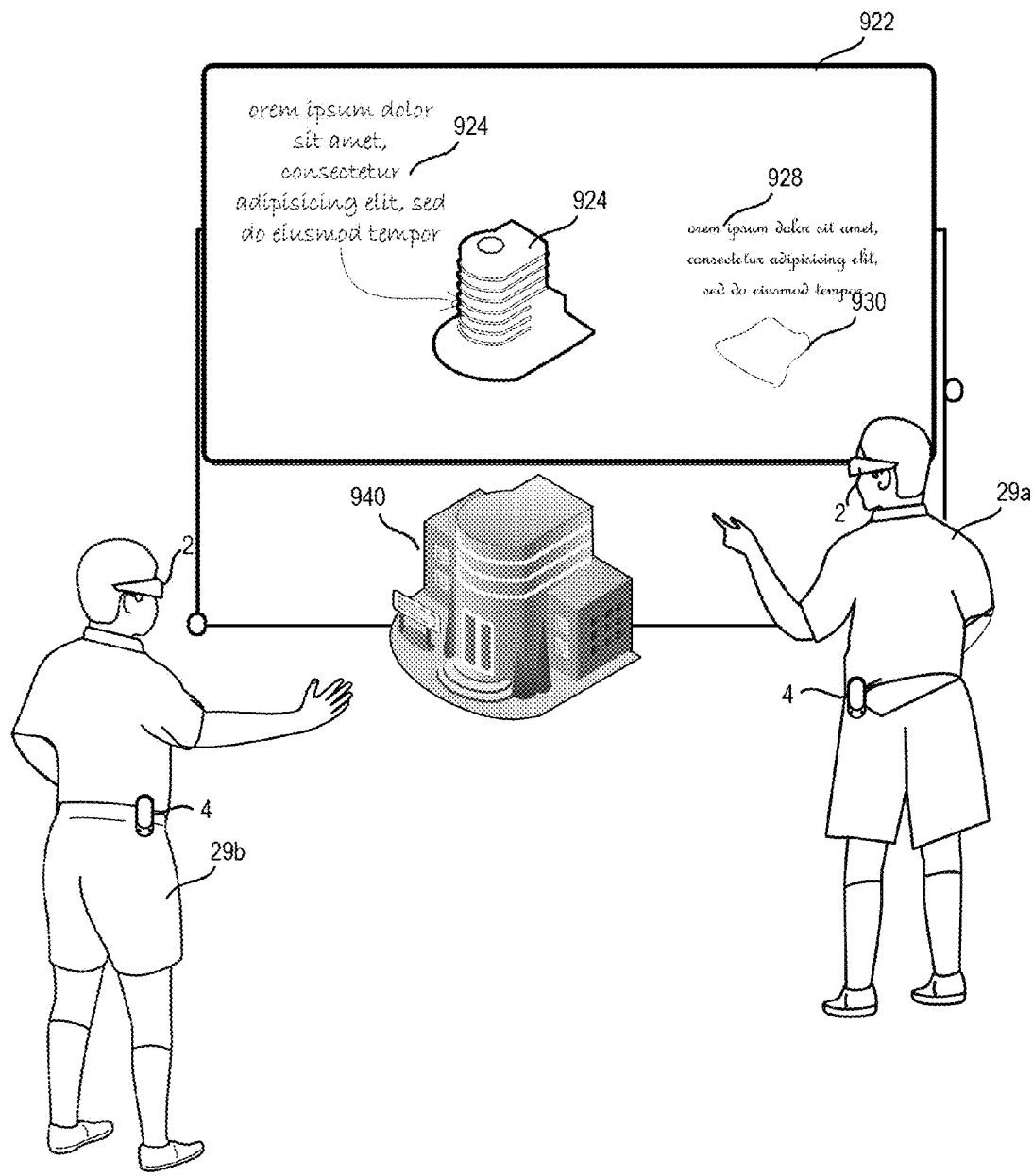
FIG. 9 illustrates two users sharing and collaborating on a real-world white board and a virtual object.
Figure 10:
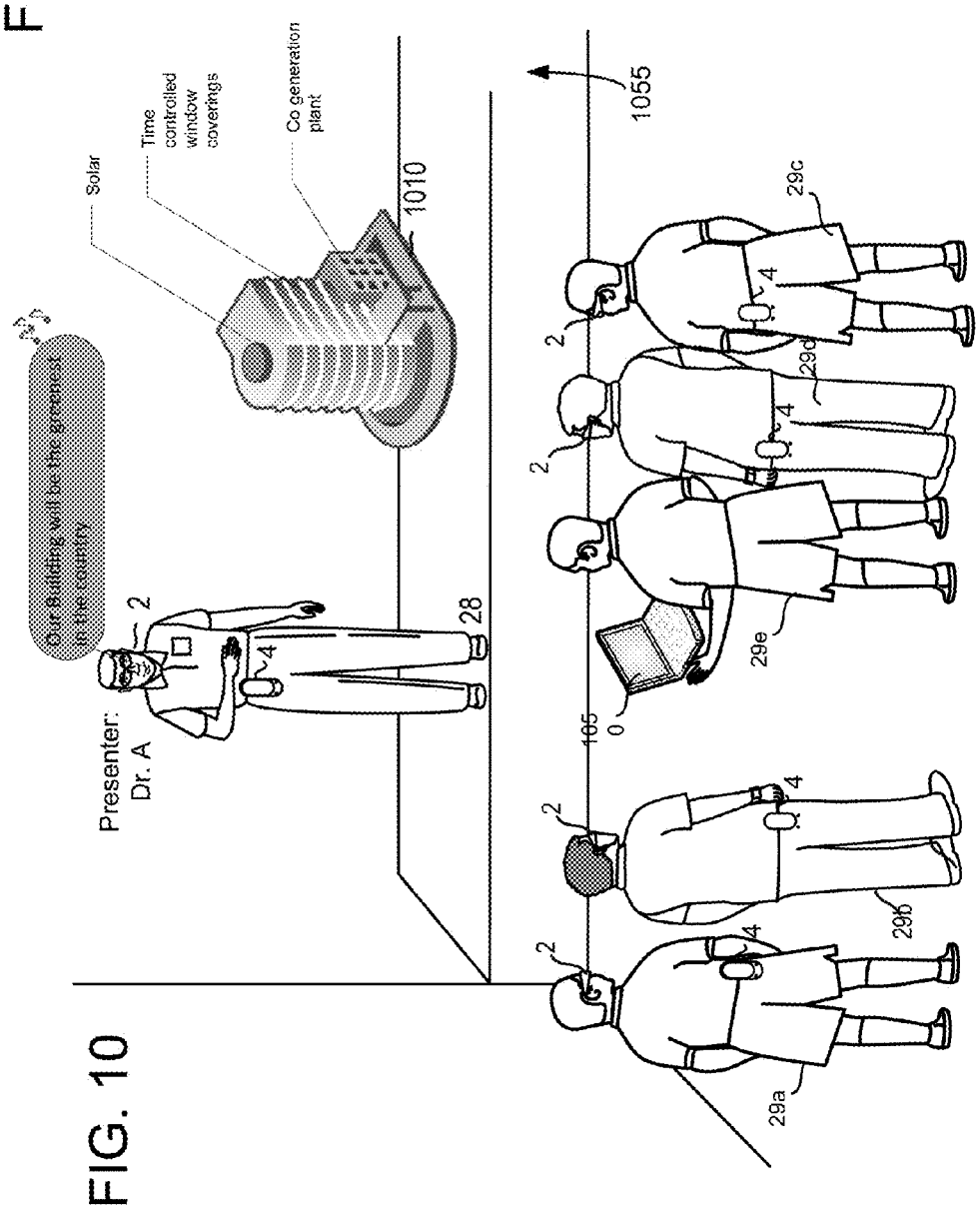
FIG. 10 illustrates a plurality of users sharing and collaborating in a presentation with a virtual object.

FIGS. 9 and 10 illustrate two different scenarios which a collaboration environment may occur. FIG. 9 shows two users 29A and 29B before a whiteboard 922. Whiteboard 922 has a number of items which have been written on the whiteboard including two text entries 924 and 928, a drawing 926 and another drawing 920. In this scenario, one of the users, for example user 29A, has chosen to share a virtual collaboration object 920 with user 29B. Object 920 can be a three-dimensional model of the building shown in drawing 926 on the whiteboard. The model can be floated in space before the whiteboard, placed on the whiteboard itself, and manipulated in three dimensions. In one aspect, user 29A allows user 29B, himself wearing a see-through head-mounted display 2 and an associated processing device 4, to see and manipulate virtual object 940. Object 940 may include annotations and other detailed information (not shown in FIG. 9) but can provide a more detailed view of the building 924 shown in FIG. 9. It should be understood that virtual object 940 can be manipulated to remove walls, show floor plans, show detailed drawings of other configuration of the building, and include any number of different augmentations and additional information which user 29A wishes to share with user 29B. As discussed herein, numerous visual cues and collaboration actions may occur between users in such an environment. Each of these different types of manipulations can be the subject of collaboration events between the users, and a sharing user—user 29A in this example—can exert control over how much input user 29b has over the collaboration object shared. As discussed below, these permissions can be arranged in classes or levels of users, the permissions subject to user authentication and device capabilities, and visualized by users of the virtual collaboration system.

FIG. 10 illustrates a presentation collaboration environment wherein a user 28 with a see-through head-mounted display 2 and processing device 4 is making presentation to a group of users 29A through 29E. In the example shown in FIG. 10, user 28 is presenting a virtual object 1010 of a building. User 28 is making a speech with a statement indicated at 1020 of "our building will be the greenest in the country" and referring to building virtual object 1010 which is shown along with augmentation information 1012 Augmentation information 1012 details additional features of the building. It should be understood that virtual object 1010 is observed via the see-through head-mounted displays of each of the user 29A-29D and, in one embodiment, an alternative audio-visual device 1050 of user 29E. It should be further realized that in this example, only user 28 is actually on the stage 1055. That is, user 29e looking at the stage without a display 2 sees only user 28 on an empty stage. As such object 1010 exists only in the "virtual" world of users 29A through 29D.

In a unique aspect of the present technology, alternative types of processing devices are used in conjunction with see-through head-mounted displays in order to provide collaboration sharing as discussed herein. Users 29A through 29D each have an associated see-through head-mounted display device 2 and processing device 4. As such each of the users can, if enabled to by permissions of the collaboration controlling user (in this case user 28) see the virtual object 1010 in their own see-through head-mounted display 2. User 29E is using an alternative processing device 1050 such as a laptop to view the virtual object 1010.

Figure 11:
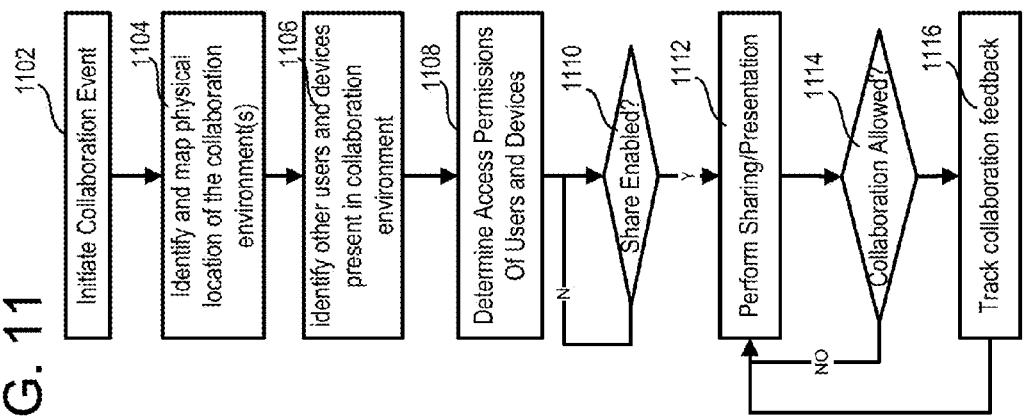
FIG. 11 is a flow chart of a method for collaboration using display devices and other audio visual devices.

FIG. 11 is a flowchart illustrating a virtual collaboration method in accordance with the present technology. At 1102, a collaboration event is initiated. Initiation of a collaboration event can include specifying data for collaboration, specifying the environment for collaboration, specifying the users and data for collaboration, and specifying the amount of collaboration input other users can have. In one aspect, one user can control collaboration, while in other aspects, multiple users can simply share items on an equal basis.

At 1104, the physical location of the collaboration environment is mapped. As illustrated in FIG. 9, a collaboration environment includes all users who are participating in the collaboration or presentation as well as their personal audio-video apparatus or see-through head-mounted displays. In FIG. 9, the collaboration environment includes the two users and the whiteboard. In FIG. 10, the collaboration environment includes the stage, the presenter, and users 29A through 29E. In such environments, certain users can be excluded from the collaboration environment based on permissions. For example, the presenter 28 might choose to exclude a user 29B based on knowledge about who the presenter is or some other reason. Returning to FIG. 11, at step 1106, the technology identifies users and devices present in the location in the collaboration environment. Turning to FIG. 10 as an example, step 1106 would include identifying all the users 29A through 29E with whom the presenter 28 is about to give the presentation, associating devices with the user, and specifying the types of devices available to the presenter 28. For example, presenter 28 would know that users 29A through 29D are capable of seeing a rich, virtual experience through their see-through head-mounted displays 2, while user 29E is limited to interaction using the laptop 1050 and will have a different experience. This allows presenter 28 to alter the presentation and collaboration as necessary based on knowledge of who he is presenting to and the ability of the other users to collaborate with him.

At 1108, access permissions of the users and devices in the collaboration environment are determined and set. At 1108, the presenter or collaborators are provided with an indication of how much sharing is available to the other users in the collaboration environment. As noted above, collaboration information can be provided with varying levels of granularity in terms of the amount of detail which is provided to each access level. At 1110, a share or collaboration is enabled. This includes providing instructions to the collaboration server to enable data to be shared amongst the various devices within the collaboration environment and to receive information from the collaboration devices as the presentation moves forward.

At 1112, the sharing or presentation is enabled and performed. Throughout the presentation, each of the collaborators may present, share, annotate, and otherwise manipulate various models in the collaboration environment. Note that where a single presenter is presenting to a larger audience, this may include allowing very limited type of interaction with the model. Where, for example, a meeting of equals is occurring, equal collaboration amongst the users may be provided. The amount of collaboration is determined at 1114 and if collaboration is allowed, then collaboration events are received and fed back to the sharing or presentation collaboration environment at 1116.

Figure 12:
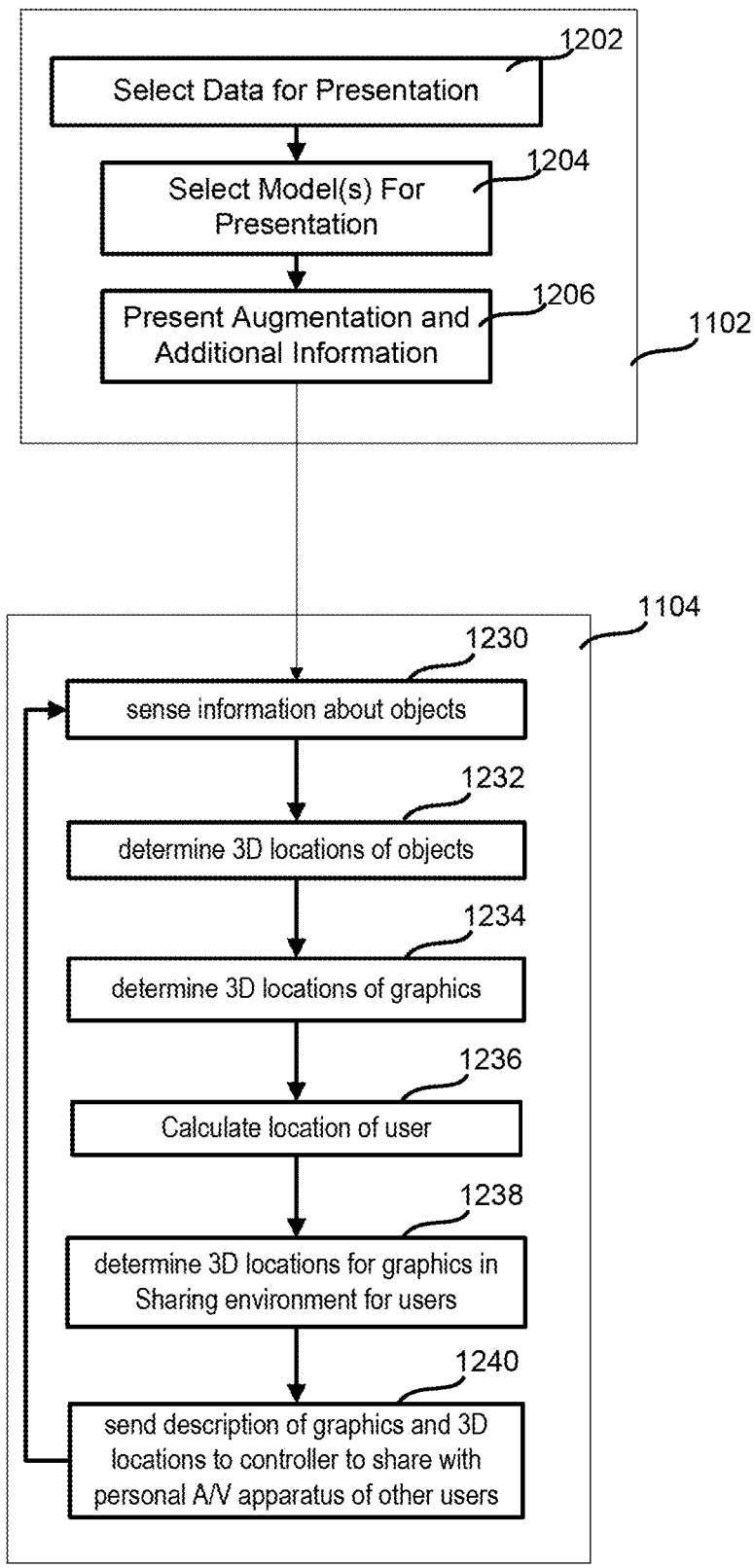
FIG. 12 is a flow chart illustrating one embodiment for implementing steps of FIG. 11.

FIG. 12 illustrates on alternative for performing steps 1102 and 1104. At 1102, the step of initiating the collaboration event can be begun by, at 1202, selecting data and models to be used in the collaboration. Each user may be presented with an inventory of sharing data which the user has specified as being available for collaboration in a particular time, or just generally available in the user inventory of virtual models. At 1204, the user selects the collaboration environment which may include the location, users, and level of security available for each of the users and each of the collaboration items, including how much information each of the users in the collaboration environment is allowed to see. At 1206, the user adds any augmentation and additional information to the collaboration environment in data which the user wishes to be presented into the collaboration environment. Collaboration permissions may be stored with the model data or maintained separately.

At 1104, as noted above, the physical location and objects in the collaboration environment are mapped. In this aspect, at 1230, information about physical objects in the collaboration environment is determined. The three-dimensional location of objects is determined at 1232 and the three-dimensional location of graphics determined at 1234. For each user in the environment, the location of the user is determined. Each user's environment must agree with all other users in the collaboration environment so that all users are sharing the same types of information and have the same respective views of the virtual object within their display or audio-visual apparatus. The location of the user gives each user a virtual "perspective" on the object being presented. Once the location of the user is calculated at 1236, the three-dimensional locations for graphics in the sharing environment is determined. The three-dimensional location of graphics is the virtual location of an object for each user. Two users viewing a virtual object in between them would, for example, see two different sides of the virtual object. The location of the graphic within their own respective display would be the same, but the location of the user relative to the object would be different. At 1240, the description of the graphics in 3-D locations are sent to the controller to share with the personal audio-visual apparatuses and display devices of each of the users.

Figure 13A:
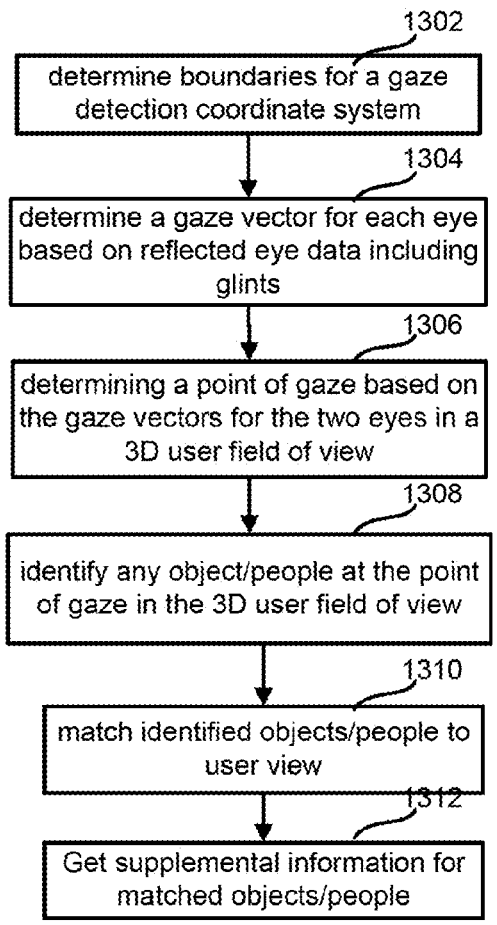
FIG. 13A and FIG. 13B are flow charts illustrating alternatives for identifying objects and users in a room.
Figure 13B:
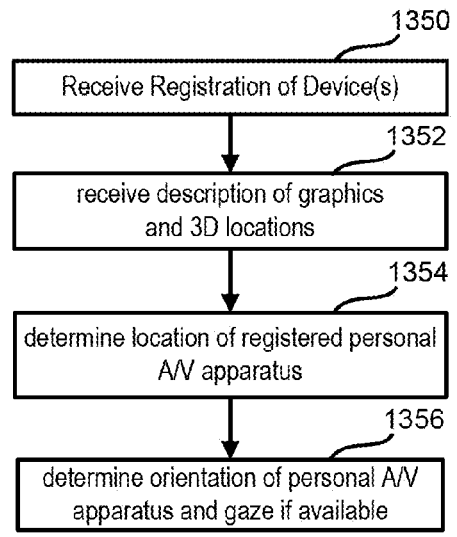

FIGS. 13A and 13B show alternatives for implementing step 1106 of FIG. 11. As noted above, at 1106, the identity of users and devices present in the collaboration environment is determined. At 1302, the boundaries for a gaze detection coordinate system are determined. Steps 1302 through 1308 provide an overall view of how a near-eye display device can leverage geometry of optical components to determine gaze and depth change between the eyeball and the display optical system. The step 1302, boundaries for a gaze detection coordinate system are determined. In step 1304, a gaze vector for each eye is determined based on reflected eye data, including glints and/or pupil reflection, and in step 1306, a point of gaze, e.g. what a user is looking at, is determined for the two eyes in a three-dimensional 3-D user field of view. As positions and identity of objects in the field of view are tracked, any object at a point of gaze in the 3-Ds or field of view is identified. In many embodiments, the user three-dimension field of view includes displayed virtual objects and actual direct views of real objects. In this case, the term object includes a person. At 1308, object at the point of gaze in the 3-Ds or field of view are identified. At 1310, identified objects and people are matched to objects in user view and at 1312, data on the user's gaze is retrieved. Objects that are the subject of the user's point of gaze are determined at 1312 and used to identify objects in the user's field of view. Once objects in the field of view are identified, users and devices will be known.

In FIG. 13B, at 1350, an alternative method of determining the identity of users and devices present in the collaboration environment is to receive the registration of devices with the collaboration server 903. At 1352, the collaboration server may receive a description of graphics in 3-D locations of the devices, as opposed to determining the actual location of the devices as described with respect to FIG. 13A. At 1354, the location of registered personal audio-visual apparatuses and see-through head-mounted displays 2 is associated with the received descriptions from step 1352. At 1356, the orientation of each personal audio-visual apparatus and gaze is determined for each user in the collaboration environment.

Figure 14:
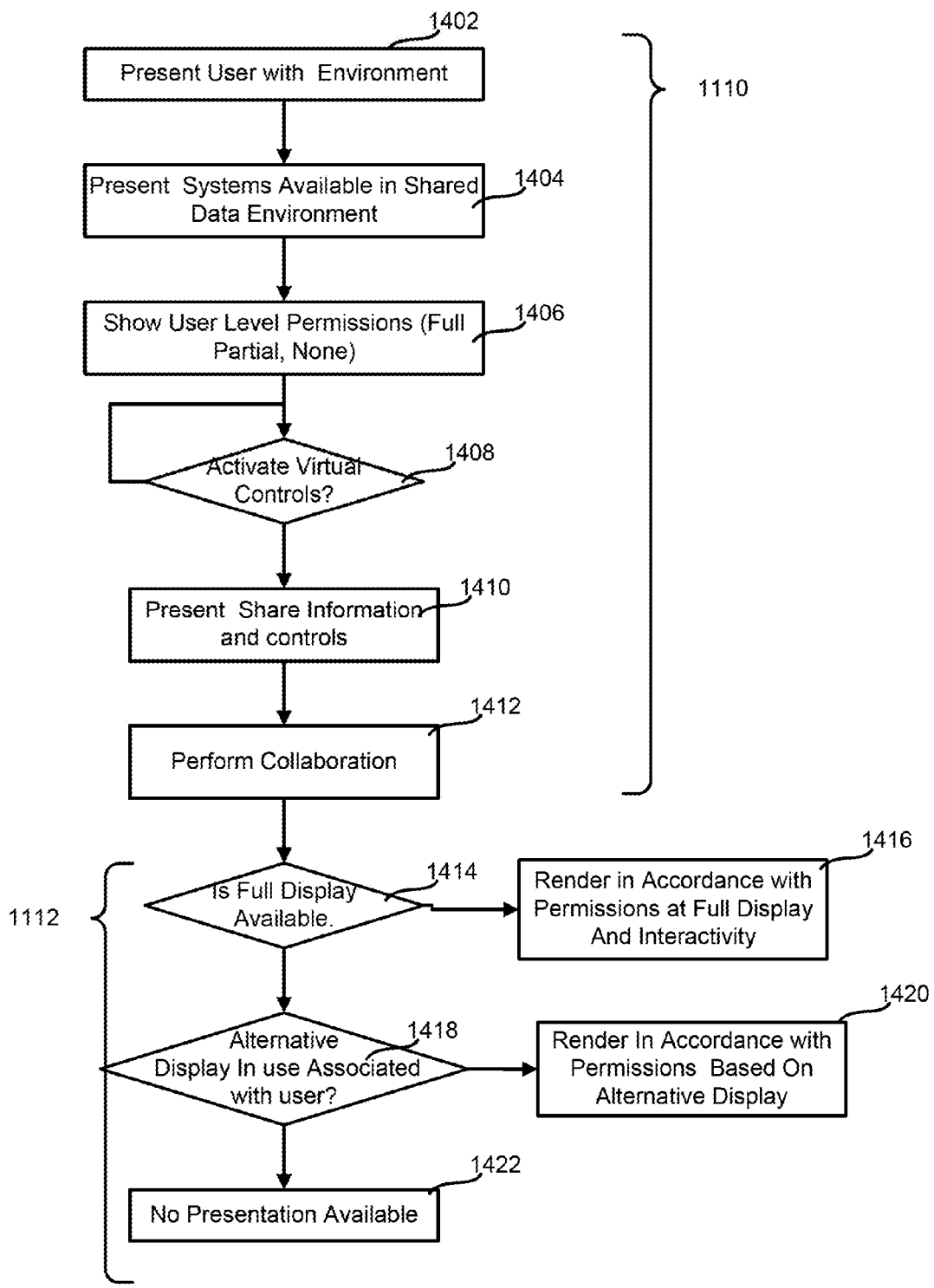
FIG. 14 is a flow chart illustrating one embodiment for implementing steps of FIG. 11.

FIG. 14 is a flowchart illustrating a method for implementing a share, and in one embodiment, for enabling steps 1110 and 1112 of FIG. 11. At 1402, the user is presented with one definition of the collaboration environment. The collaboration environment may have been specified by the user in step 1102 and mapped, as discussed above at 1106 and 1108. The collaboration environment presented at 1402 can include the number of users in the room and the data which the user is willing to share and allow others to collaborate with. At 1404, the user is presented with the systems available in the shared data environment. Presentation of the various systems in use in the environment will allow the user to understand the capabilities of the display devices of each of the other users in the collaboration environment. At 1406, the collaborator is presented with a representation of user-level permissions for each of the users in the collaboration environment. User-level permissions can reflect the ability of each of the users to view the available information that is going to be provided by the collaborator. The user can then select to see virtual controls allowing the user to change the user-level permissions renderings or other aspects of the collaboration environment. At 1410, the presenter can make changes to the present collaboration environment including what is being presented, who it is being presented to, the amount that is being presented and other changes that the user wishes to affect before leaving the presentation. At 1412, the actions of the collaborators are tracked and shared data is presented to users within the collaboration environment in accordance with the settings of the collaboration environment.

As will be described below, for a presenter wearing a display device 2, motions of the user and virtual actions in manipulating virtual objects can be interpreted and presented back to other users within the collaboration environment. For example, if a user places a virtual object in the collaboration environment, rotates it, augments it, or makes some annotation to it, all these actions would be presented to the collaboration environment. As the user continues to manipulate the virtual object, these items and actions are tracked at 1412 and alter the collaboration environment. At 1414, determination is made as to whether or not a full display is available. If so, then the collaboration environment is rendered for the user in accordance with permissions available to the user at a full display capability and interactiveness. For example, users wearing a display device 2 would see a complete virtual world as specified by a presenter if they have permissions to view the world. At 1418, if no full display is available, a determination is made as to whether an alternative display is in use and associated with the user. If so, at 1420 the collaboration is rendered in accordance with the permissions available to the user based on the alternative display's capability. If no device is available, then no presentation is available at 1422.

Figure 15:
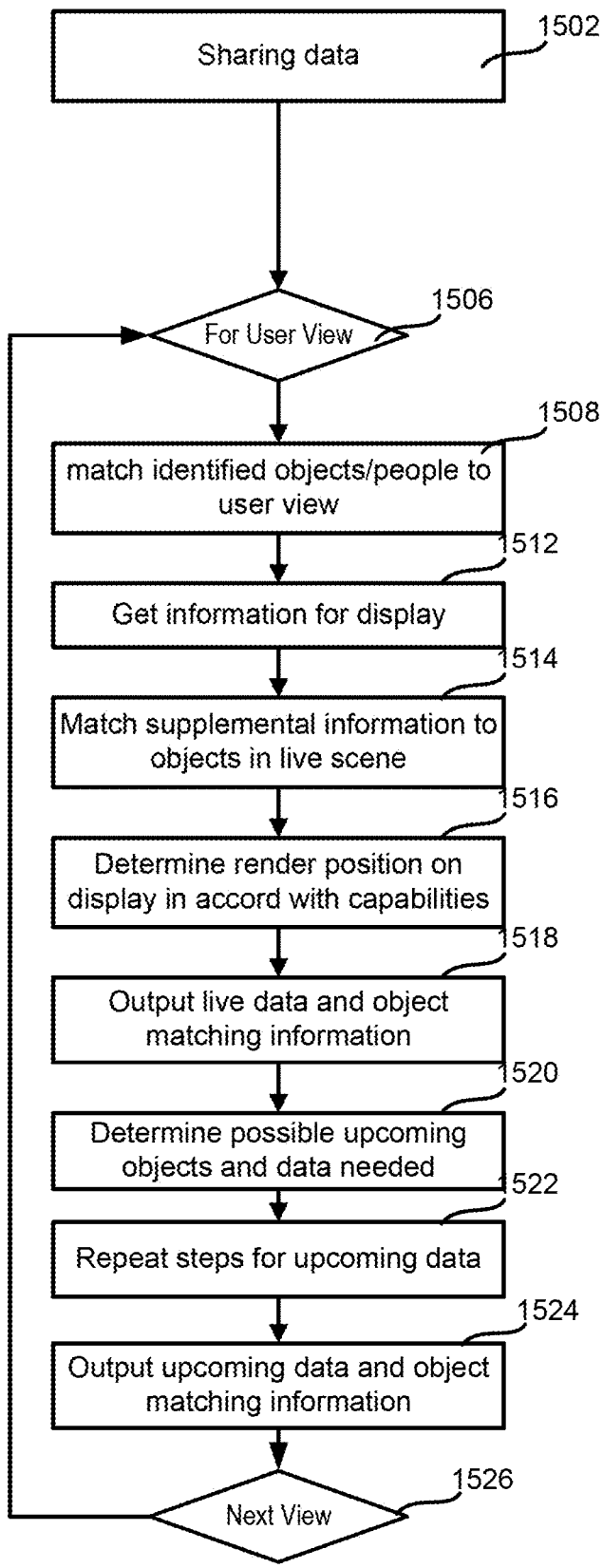
FIG. 15 is a flow chart illustrating one embodiment for implementing steps of FIG. 14.

FIG. 15 presents a flowchart which is one alternative of a method for performing step 1410—tracking a collaboration—in FIG. 14. As sharing data is presented, for each user view within the collaboration environment at 1506, identified objects and people are matched in the user's view at 1508. It should be understood that the method of FIG. 15 is performed for each user wearing a display device or with an associated personal audio-video device. Once objects are matched at 1508, information for the objects in the display is received at 1512 and the information is matched to objects within the scene at 1514. At 1516, the position for rendering the virtual objects is determined in accordance with the capabilities of the device which is associated with the user. At 1518, live data and object-matching information is output to the user's respective display. At 1520, other objects which may be needed in the presentation may be gathered and readied for presentation in order to increase the availability and performance of the process. At 1520, once these objects are determined, at 1522 steps 1508 through 1516 can be repeated for each of the upcoming objects. When needed, the upcoming data and object-matching information can be outputted at 1524. As noted above, at 1526 the method of FIG. 15 is repeated at 1526 for each respective view of the user. That is, when a user changes their respective view within the virtual object of the room, a user's view of objects in the collaboration or in the virtual environment changes.

Figure 16:
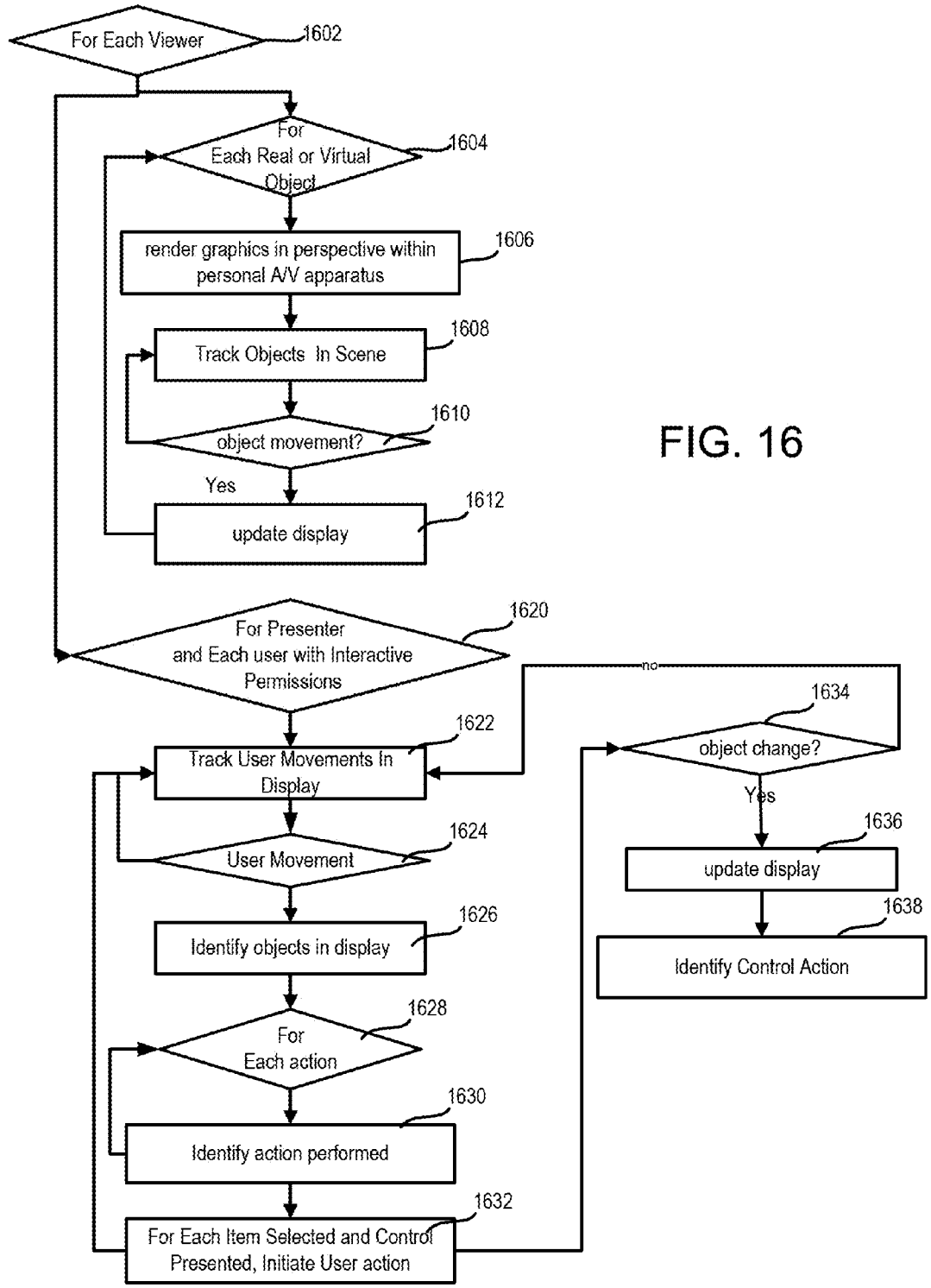
FIG. 16 is a flow chart illustrating one embodiment for implementing steps of FIG. 14.
Figure 17B:
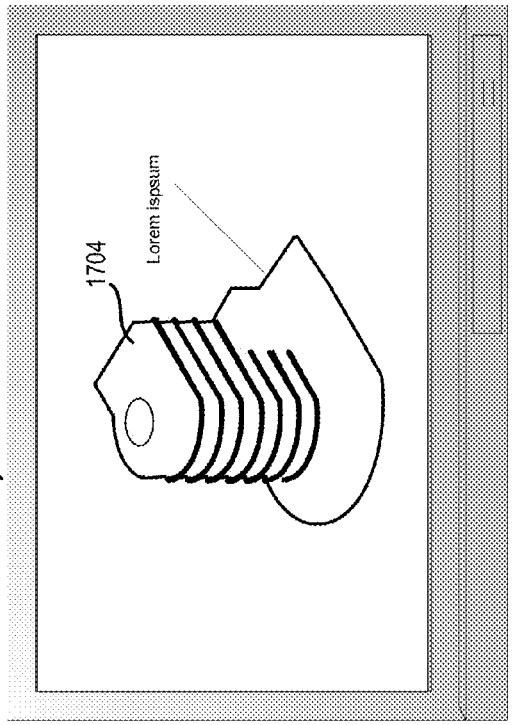
FIGS. 17A and 17b illustrate user views of a virtual object using a see through display device and a different personal audio-visual device.
Figure 17A:
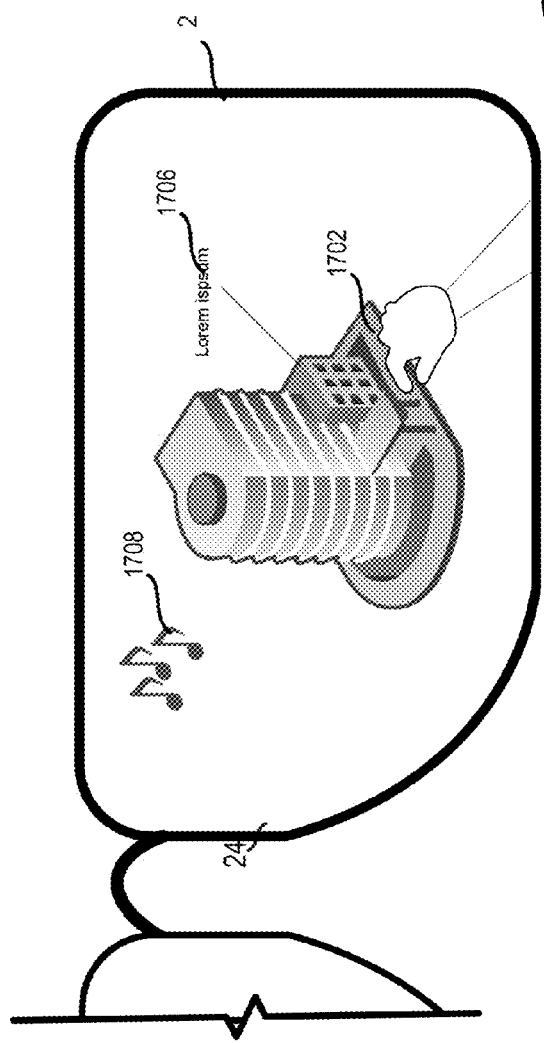

FIG. 16 is a flowchart representing one method for implementing step 1412 at FIG. 14 in terms of tracking user actions and presenting shared data. At 1412, renderings are made for each user with permissions to view the collaboration environment. Additionally, any presenter or user with collaboration permissions allowing them to manipulate objects must be tracked. At 1602, for each viewer, and for each real or virtual object 1604, graphics are rendered in perspective within the personal audio-visual apparatus of the user at 1606. As noted above, and described in more detail below, this will change based on the type of audio-visual apparatus in use by a particular user and based on the capabilities of that device. The movement of objects both virtual and real is tracked within the user's field of view at 1608. If the object is moved either virtually or in real space at 1610, then the display is updated at 1612 in accordance with the capabilities of the display. If the object does not move, the system continues to track the objects in the scene at 1608. In addition, at 1620, for each presenter and for each user with interactive permissions, user movements are tracked within the capabilities of either the cameras discussed above with respect to FIG. 1A, or the display apparatus 2. User movements are tracked and if a user manipulates an object within the display at 1626, for each control action at 1628 user motion relative to the action is tracked at 1630. For each item selected and control presented the user action is initiated at 1632. If an object is changed, such as by moving, rotating, annotating or otherwise at 1634, the display is updated at 1636. If a control action occurs at 1638, the control action is implemented. The steps 1620 through 1638 occur both for presenters, and can constitute an embodiment of step 1116 for collaborators who are participating in the collaboration event.

As noted briefly above, actions of both presenters and collaborators can include manipulating virtual objects in virtual space, as well as manipulating real objects in real space in the collaboration environment. Both the mapping of the virtual object within the display as well as the mapping of a virtual object on a real object can be updated in accordance with the method of FIG. 16. For example, if a user draws a virtual object on a movable whiteboard which is a real object, and subsequently moves the real object whiteboard, the virtual object must move with the real object whiteboard. Linking the virtual object to the real object in the user space allows this mapping to occur.

FIGS. 17 through 22 present various embodiments of user views in both a display device 2 and personal audio-visual apparatuses. FIGS. 17A and 17B illustrate that the view of an object in a display apparatus 2 may be richer and more complete than that on a different audio-visual device such as a laptop 1050. FIG. 17A shows the perspective of a user viewing a display apparatus 2. This user would see a full virtual object 1702 comprising a building with full annotations and fully manipulated by the collaborator. As a collaborator touches the object and rotates it within the scene, the object will move within the scene. Any sound or other annotations associated with the object will be fully presented to user of the display apparatus 2. A device with more limited capabilities, such as the laptop, may not be able to present the three-dimensional aspects of the building 702. As such, as illustrated in FIG. 17B, a user with a laptop viewing the same collaboration presentation would see a more limited view of the building 1704. While this more limited view 1704 is illustrated, for example, without the perspective available in the view in FIG. 17A, annotations may still appear as illustrated in FIG. 7B.

Figure 18A:
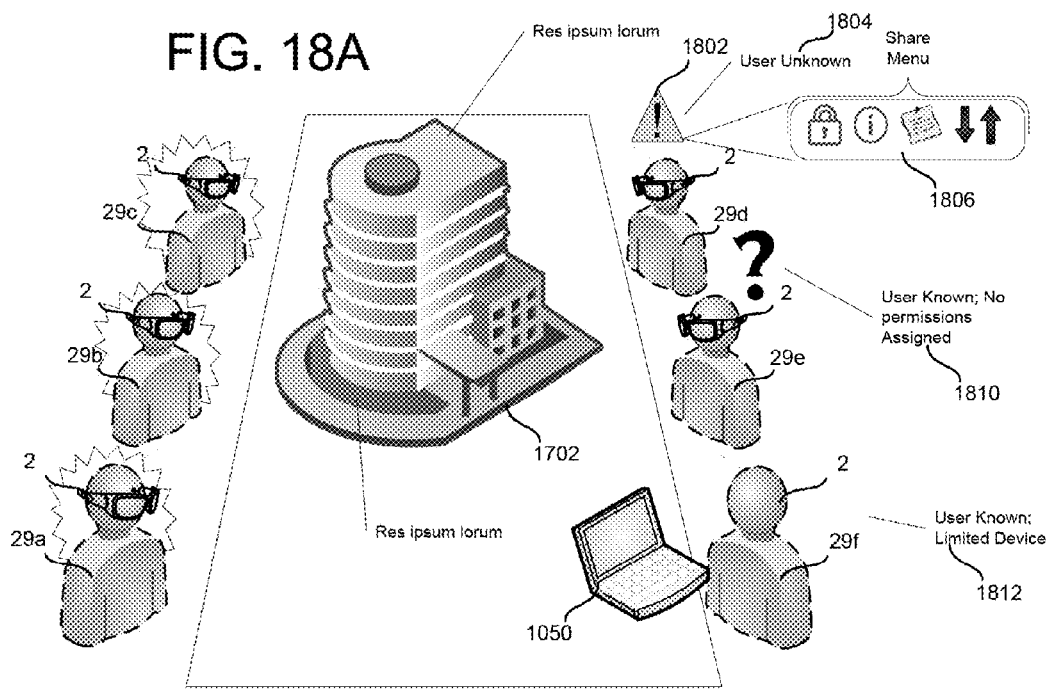
FIGS. 18A and 18B illustrate user views of a virtual object virtual collaboration environment with other users sharing a virtual object.
Figure 18B:
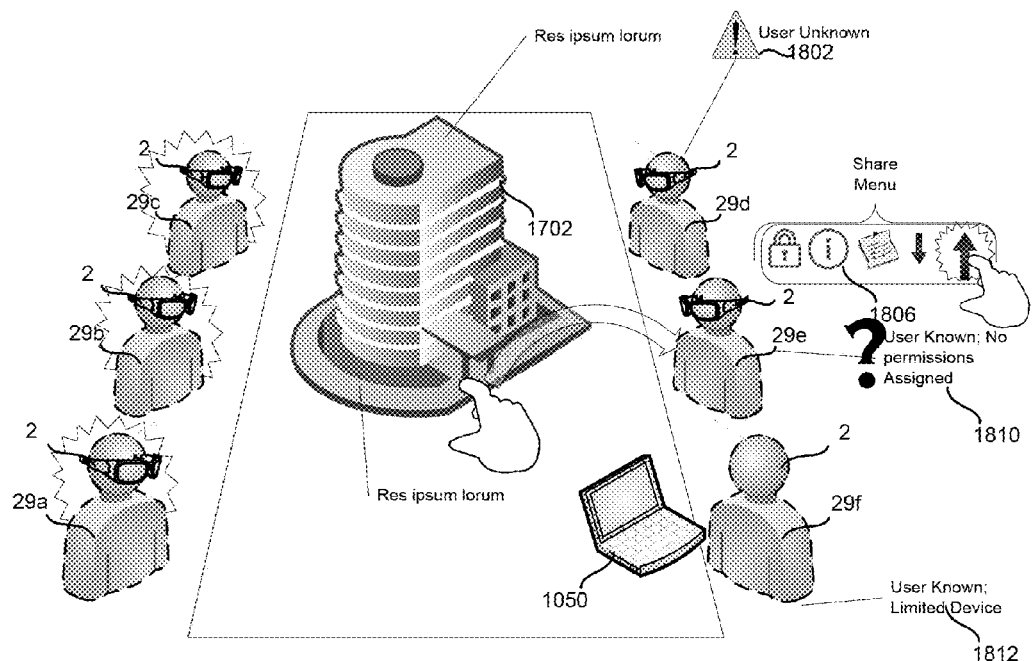

FIGS. 18A and 18B illustrate various control elements and views for a user in a collaboration. FIGS. 18A and 18B represent the view of a user through the perspective of a display apparatus 2, but for purposes of clarity, illustration of the outline of the device 2 (depicted, for example, in FIGS. 17A and 19B) is omitted. FIGS. 18a and 18B show a meeting comprising a plurality of users 29A through 29F who are positioned around a conference table and viewing a virtual object 1702. The view in the Figures is a view which may appear from the perspective of another user through a display device 2—e.g. a wearer of a display device—of the scene depicted in the Figures. Users 29A through 29E are all operating display apparatuses 2 which comprise see-through head-mounted displays. User 29F is participating in the collaboration using a laptop. In this collaboration, no one user is defined as the presenter, though one of the users 29A through 29F would likely control or initially present the virtual object 1702.

One feature the technology illustrates graphically or audibly or both, the relationships of the users in the collaboration environment to the wearer. In this instance, users 29A through 29C are all highlighted with a bright light 1820 indicating they are authorized and/or known to the user and may themselves view the virtual object 1702. User 29D, however, is highlighted with an icon 1802 alerting the wearer to the fact that the user is not known as indicated by annotation 1704. Similarly, user 29E has an icon 1809 indicating that while the user is known, no permissions have been assigned to this user as indicated by the annotation 1810. Finally, user 29F is shown with an additional annotation 1812 indicating that while the user is known, the user is operating a limited device. Any number of variations on altering the wearer to distinctions in the sharing environment may be provided. Additionally, the wearer may be presented with a set of controls allowing the user to adjust the permissions and authorization of known and unknown users (and any other users in the collaboration environment).

A menu 1806 is illustrated for user 29D. To the wearer, the menu may be floating in space adjacent respective users based on the wearer's focus on the users, and appear and disappear whether the wearer focuses on the user. In this example, the menu 1806 includes a lock icon, an information icon, a notes icon, and arrows allowing the user to increase or decrease the permission level of the user 1804. More or fewer menu items may be provided. Selecting one of the icons can allow the wearer to identify the unknown user, select permission levels for the user, or block the user from viewing the presentation altogether. A manner of manipulating the controls is illustrated in FIG. 18B. In FIG. 18B, a user can select a virtual object 1702 using their hand and drag the virtual object on to user 29E in order to allow the user to view the object which the user may previously not have been able to view because no permissions were assigned as illustrated in FIG. 18A. Alternatively, the wearer selects menu items using the user's hand 1820 and the individual menu item responds as a toggle or other type of interface control. In the example at FIG. 18B, the users selects the up arrow to increase the user's permissions on the share menu 1806.

It will be understood that various forms of user controls which may be manipulated in virtual space by a user may be provided.

Figure 19A:
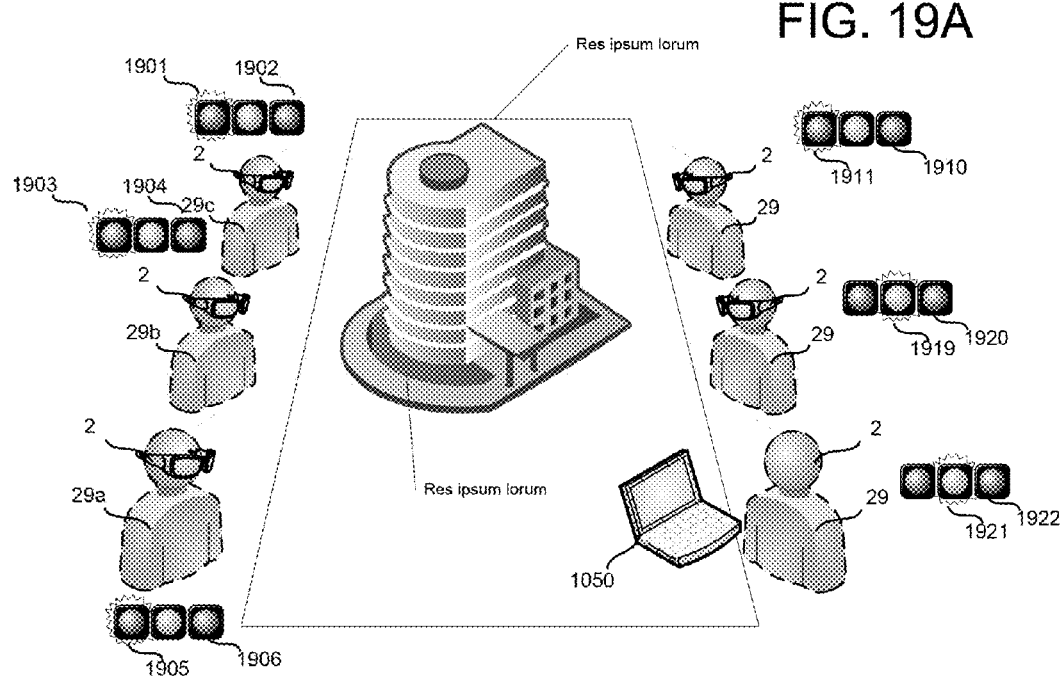
FIGS. 19A through 19C illustrate additional user views of a virtual object virtual collaboration environment with other users sharing a virtual object.
Figure 19B:
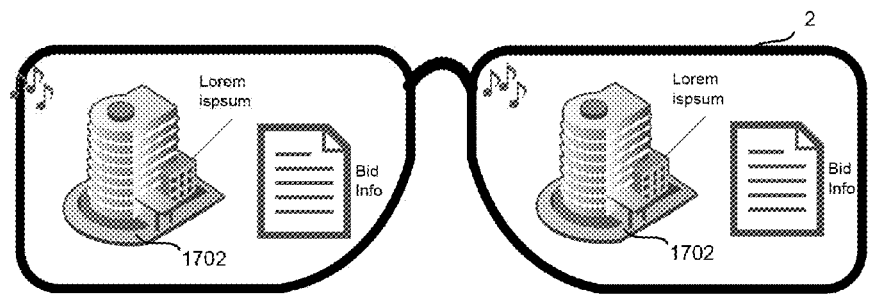
Figure 19C:
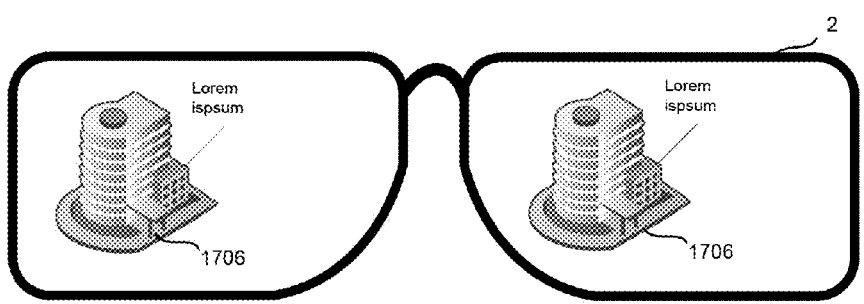

One manner of visually highlighting the permission states of the users is illustrated in FIG. 19A. In FIG. 19A, each user 29A through 29F has an associated "stop light" icon. Icons 1902, 1904, 1906 and 1910 are all flashing green, illustrating that each of these users 29A through 29D have full permissions with respect to the virtual object 1702. User 29E and 29F are both shown with yellow stop light icons (1919 and 1921) in this instance, the view afforded these users of the presentation may differ as illustrated in FIGS. 19B and 19C. In FIG. 19B illustrates the views available to users 29A through 29D. As shown therein, the virtual object 1702 has full annotations, associated audio, and, in this example, bid information which is visible to these users. FIG. 19C shows the more limited view of virtual object 1702, item 1706, which does not illustrate the bid information or the audio associated with the building. In this manner, various levels of granularity in terms of the amount of detail available to various users can be presented in the same collaboration environment under the control of the controlling user.

Figure 20:
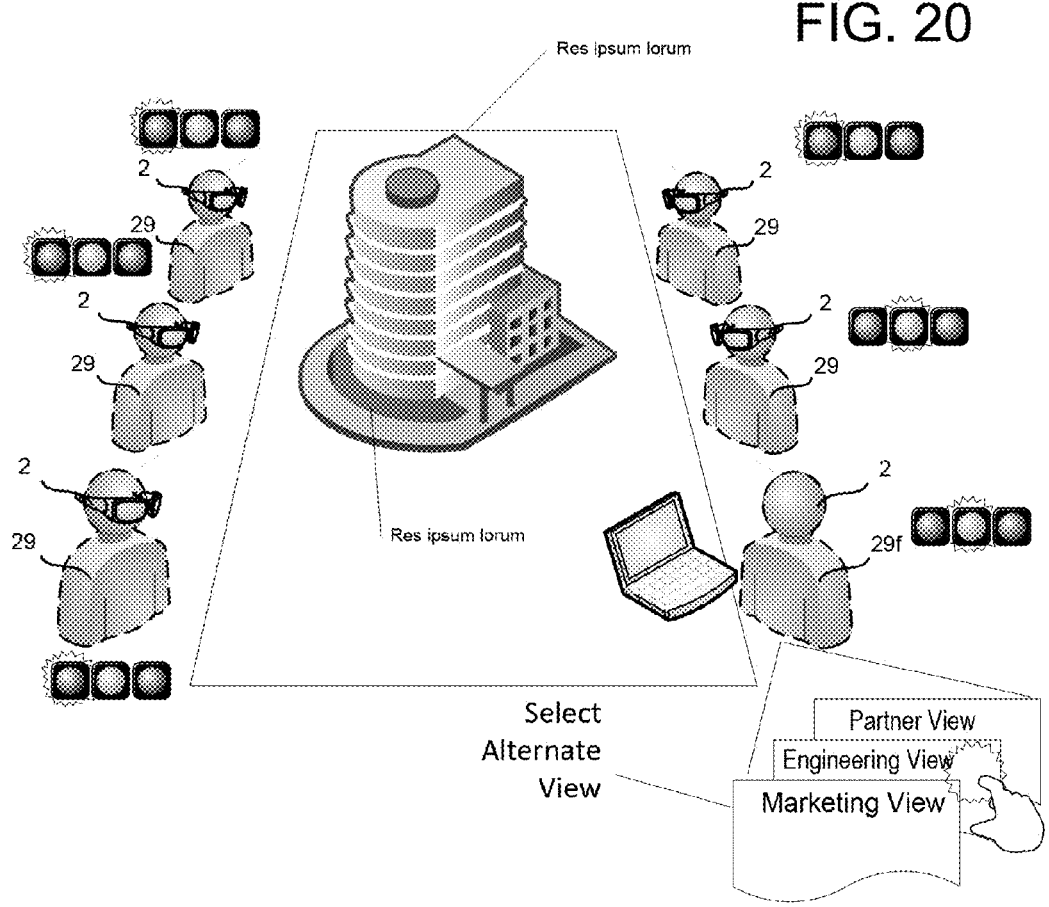
FIGS. 20 and 21 illustrate user views of sharing controls in a virtual object virtual collaboration environment.

FIG. 20 illustrates a view similar to that shown in FIG. 19A, represents an alternative selection view to the controlling user. In FIG. 20, a user is allowed to select different types of views which might be available to the different users in the room. User 29E, having a cautionary signal associated with them, can be allowed to view a different level of granularity. The views available to the engineering department of the building 1702 might be different than those available to the marketing department or a partner such as a contractor. The collaborating user can allow user 29E to view of these alternative views and still participate in the collaboration meeting.

Figure 21:
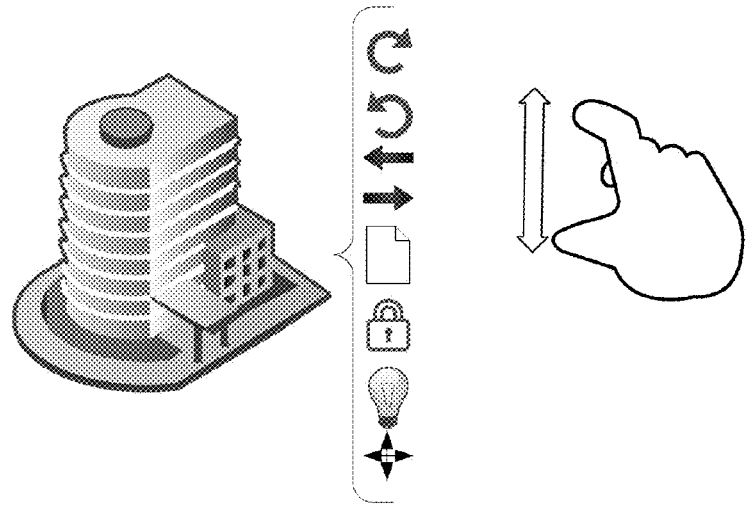

FIG. 21 illustrates a manner in which a user might select any of the alternative menus. A user can use a pinch command to expand or contract a menu on a virtual object, generate a menu view, pinch the command closed to close the menu, and rotate, drag, drop and otherwise manipulate the virtual object within the collaboration environment for all users.

Figure 22:
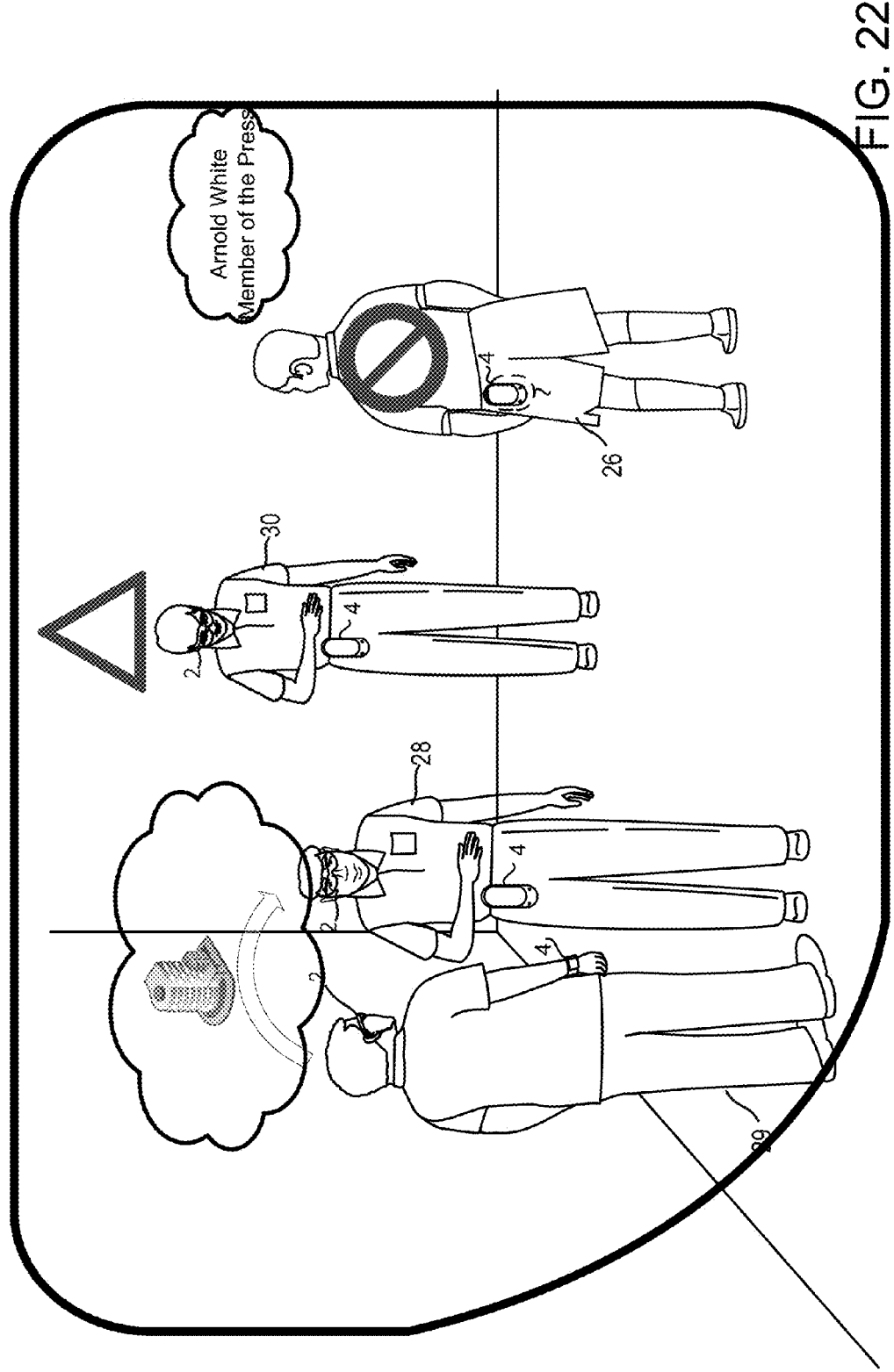
FIG. 22 illustrates user views of shared items and relationships between two users sharing and collaborating.

FIG. 22 illustrates another virtual view of the relationships between users in a collaboration environment from the view of a wearer/collaborator. The view illustrated in FIG. 22 allows a wearer to visualize the relationships between users in the room. In this case user 28 and user 29 are indicated as having a relationship by the existence of cloud 2210 which shows the sharing of the virtual object 1702 between the two users. Likewise user 26 30 is illustrated as being a "press corps representative" with whom security prevents sharing of collaborative date. User 26 and user 30 are marked by the technology as being of concern, or with a visual representation of their security clearance in the collaboration environment. This allows the collaborator to understand that objects should not be shared with the press representative, and that users 29 and 30 share a special relationship which is not visible to other users in the room.

Figure 23:
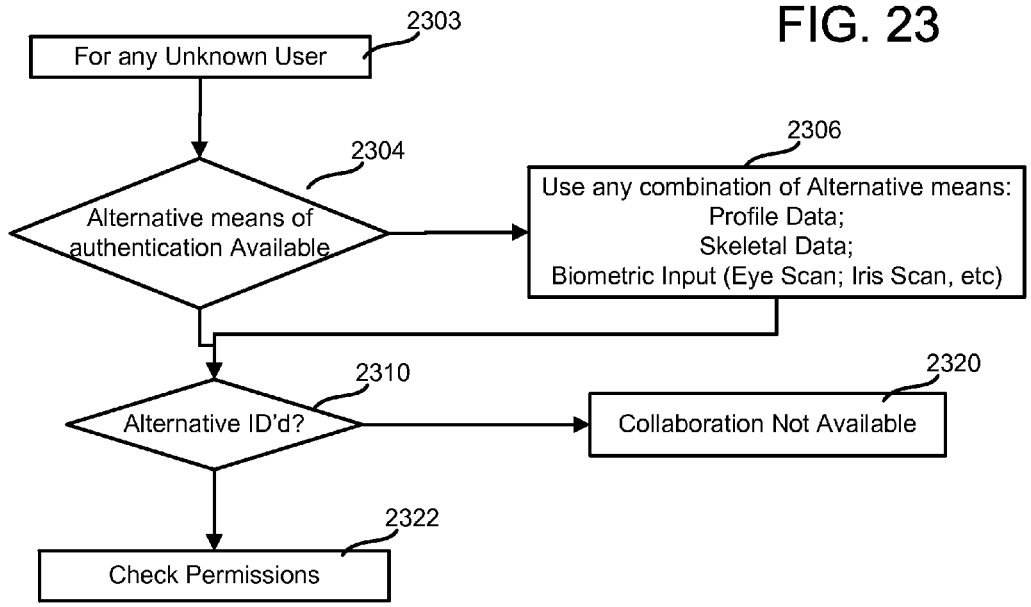
FIG. 23 is a flowchart illustrating biometric authentication for the collaboration system

FIG. 23 illustrates a method of user biometrics to identify users in a collaboration environment. Users can be identified in any number of ways, including manually registering the users, determining the user based on the user's device and a visual or audio profile of the user, or manual identification by a presenting collaborator. For any unknown user in a collaboration environment at 2302, biometric alternative means of authentication may be used. For a user at 2303, if biometric inputs are available at 2304, any combination of alternative means including profile data, skeletal data, biometric input including iris scan, fingerprint and other biometric means, can be used to identify the user. As noted above, display device 2 includes, for example, gaze detection elements and audio detection elements that can determine biometric inputs from a wearer. This information can be used to identify and authenticate the user to the collaboration environment. If the user has been alternatively identified at 2310, permissions can be set at 2322. If no alternative ID is available and no means of identifying the user is available, then collaboration will not be available to the user at 2320.

Figure 24:
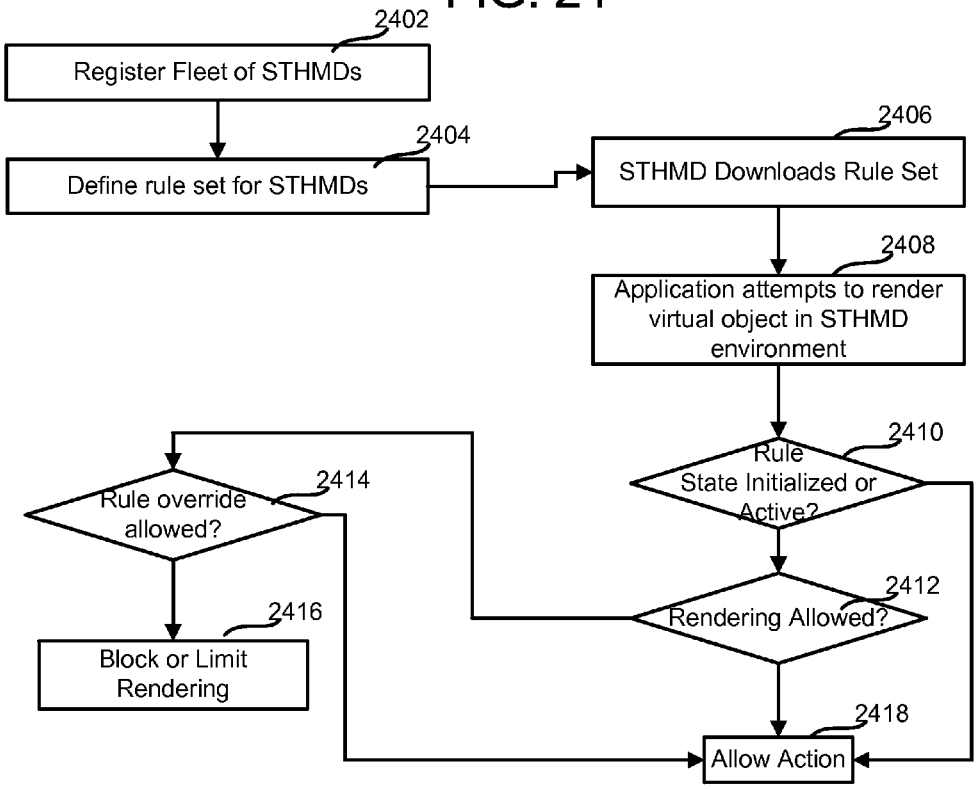
FIG. 24 is a flowchart illustrating a method of managing a fleet of see through display devices.

FIG. 24 illustrates a method used in conjunction with the present technology of managing a fleet of see-through head-mounted devices such as display device 2. At 2402, a fleet of associated head-mounted devices is registered. Each device in the associated fleet of head-mounted devices will comprise a device which is managed by a central authority such as a collaboration server or other means. In 2406 a rule set for each of the devices can be configured by a user controlling the fleet of devices. Individual devices may have their own individual rules, or a complete set of rules can be managed for the entire fleet of devices. Whenever a device wishes to take an action, such as display a virtual object, a determination is made as to whether or not the rule is initialized or active at 2410. If the rule blocks usage or otherwise constrains usage of the device, then a determination is made at 2412 as to whether or not the rule can be overridden by a local user. If not, the rule is enforced. If so, the rule can be over ridden subject to the overriding rules of the device.

Rule management can be extended from a master administrative user for a fleet of see through head mounted displays or from a user having permissions to access the display. The rules can allow users to control the use of display by preventing third party access or access at specific times or to specific features. For example, turning off location sharing generally or to specific third parties and preventing access during business hours. Where the displays are used in a business, a manager can provide permissions for shared experience by business users, parental controls for minors, or any environment where a master administrator controls user of functions of the display, such as, for example, blocking applications or use of particular functions making the device more suitable for limited applications of a business.

Figure 25:
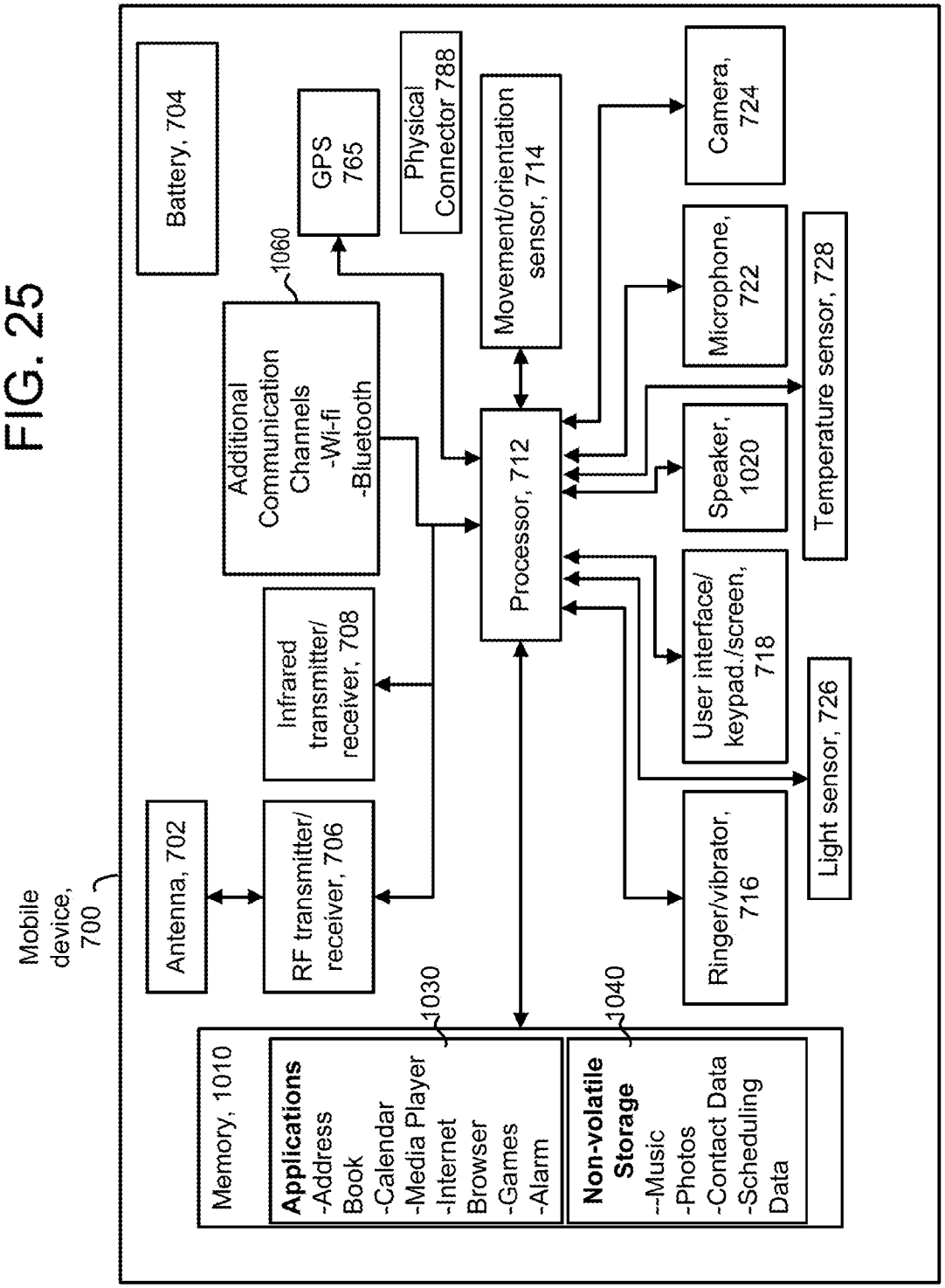
FIG. 25 is a block diagram of a mobile device.

FIG. 25 is a block diagram of an exemplary mobile device which may operate in embodiments of the technology described herein (e.g. device 5). Exemplary electronic circuitry of a typical mobile phone is depicted. The phone 700 includes one or more microprocessors 712, and memory 1010 (e.g., non-volatile memory such as ROM and volatile memory such as RAM) which stores processor-readable code which is executed by one or more processors of the control processor 712 to implement the functionality described herein.

Mobile device 700 may include, for example, processors 712, memory 1010 including applications and non-volatile storage. The processor 712 can implement communications, as well as any number of applications, including the interaction applications discussed herein. Memory 1010 can be any variety of memory storage media types, including non-volatile and volatile memory. A device operating system handles the different operations of the mobile device 700 and may contain user interfaces for operations, such as placing and receiving phone calls, text messaging, checking voicemail, and the like. The applications 1030 can be any assortment of programs, such as a camera application for photos and/or videos, an address book, a calendar application, a media player, an Internet browser, games, other multimedia applications, an alarm application, other third party applications, the interaction application discussed herein, and the like. The non-volatile storage component 1040 in memory 1010 contains data such as web caches, music, photos, contact data, scheduling data, and other files.

The processor 712 also communicates with RF transmit/receive circuitry 706 which in turn is coupled to an antenna 702, with an infrared transmitted/receiver 708, with any additional communication channels 1060 like Wi-Fi or Bluetooth, and with a movement/orientation sensor 714 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 712 further communicates with a ringer/vibrator 716, a user interface keypad/screen, biometric sensor system 718, a speaker 1020, a microphone 722, a camera 724, a light sensor 726 and a temperature sensor 728.

The processor 712 controls transmission and reception of wireless signals. During a transmission mode, the processor 712 provides a voice signal from microphone 722, or other data signal, to the RF transmit/receive circuitry 706. The transmit/receive circuitry 706 transmits the signal to a remote station (e.g., a fixed station, operator, other cellular phones, etc.) for communication through the antenna 702. The ringer/vibrator 716 is used to signal an incoming call, text message, calendar reminder, alarm clock reminder, or other notification to the user. During a receiving mode, the transmit/receive circuitry 706 receives a voice or other data signal from a remote station through the antenna 702. A received voice signal is provided to the speaker 1020 while other received data signals are also processed appropriately.

Additionally, a physical connector 788 can be used to connect the mobile device 700 to an external power source, such as an AC adapter or powered docking station. The physical connector 788 can also be used as a data connection to a computing device. The data connection allows for operations such as synchronizing mobile device data with the computing data on another device.

A GPS transceiver 765 utilizing satellite-based radio navigation to relay the position of the user applications is enabled for such service.

The example computer systems illustrated in the Figures include examples of computer readable storage media. Computer readable storage media are also processor readable storage media. Such media may include volatile and nonvolatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

Figure 26:
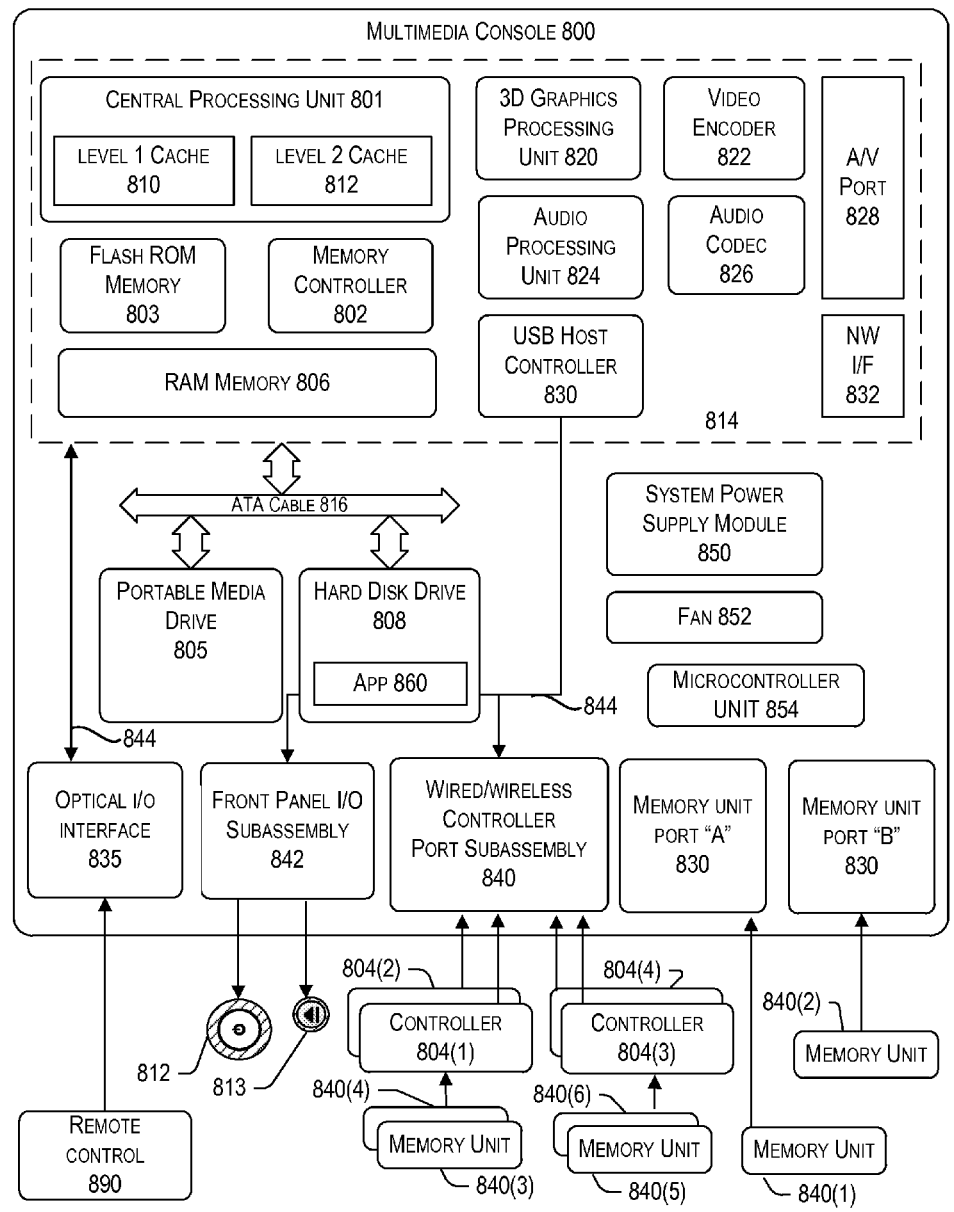
FIG. 26 is a block diagram of a gaming system console.

FIG. 26 is a block diagram of one embodiment of a computing system that can be used to implement a hub computing system like that of FIGS. 1A and 1B. In this embodiment, the computing system is a multimedia console 800, such as a gaming console. As shown in FIG. 18, the multimedia console 800 has a central processing unit (CPU) 801, and a memory controller 802 that facilitates processor access to various types of memory, including a flash Read Only Memory (ROM) 803, a Random Access Memory (RAM) 806, a hard disk drive 808, and portable media drive 806. In one implementation, CPU 801 includes a level 1 cache 810 and a level 2 cache 812, to temporarily store data and hence reduce the number of memory access cycles made to the hard drive 808, thereby improving processing speed and throughput.

CPU 801, memory controller 802, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 801, memory controller 802, ROM 803, and RAM 806 are integrated onto a common module 814. In this implementation, ROM 803 is conFigured as a flash ROM that is connected to memory controller 802 via a PCI bus and a ROM bus (neither of which are shown). RAM 806 is conFigured as multiple Double Data Rate Synchronous Dynamic RAM (DDR SDRAM) modules that are independently controlled by memory controller 802 via separate buses (not shown). Hard disk drive 808 and portable media drive 805 are shown connected to the memory controller 802 via the PCI bus and an AT Attachment (ATA) bus 816. However, in other implementations, dedicated data bus structures of different types can also be applied in the alternative.

A graphics processing unit 820 and a video encoder 822 form a video processing pipeline for high speed and high resolution (e.g., High Definition) graphics processing. Data are carried from graphics processing unit (GPU) 820 to video encoder 822 via a digital video bus (not shown). Lightweight messages generated by the system applications (e.g., pop ups) are displayed by using a GPU 820 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 824 and an audio codec (coder/decoder) 826 form a corresponding audio processing pipeline for multi-channel audio processing of various digital audio formats. Audio data are carried between audio processing unit 824 and audio codec 826 via a communication link (not shown). The video and audio processing pipelines output data to an NV (audio/video) port 828 for transmission to a television or other display. In the illustrated implementation, video and audio processing components 820-828 are mounted on module 214.

FIG. 26 shows module 814 including a USB host controller 830 and a network interface 832. USB host controller 830 is shown in communication with CPU 801 and memory controller 802 via a bus (e.g., PCI bus) and serves as host for peripheral controllers 804(1)-804(4). Network interface 832 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 26 console 800 includes a controller support subassembly 840 for supporting four controllers 804(1)-804(4). The controller support subassembly 840 includes any hardware and software components needed to support wired and wireless operation with an external control device, such as for example, a media and game controller. A front panel I/O subassembly 842 supports the multiple functionalities of power button 812, the eject button 813, as well as any LEDs (light emitting diodes) or other indicators exposed on the outer surface of console 802. Subassemblies 840 and 842 are in communication with module 814 via one or more cable assemblies 844. In other implementations, console 800 can include additional controller subassemblies. The illustrated implementation also shows an optical I/O interface 835 that is conFigured to send and receive signals that can be communicated to module 814.

MUs 840(1) and 840(2) are illustrated as being connectable to MU ports "A" 830(1) and "B" 830(2) respectively. Additional MUs (e.g., MUs 840(3)-840(6)) are illustrated as being connectable to controllers 804(1) and 804(3), i.e., two MUs for each controller. Controllers 804(2) and 804(4) can also be conFigured to receive MUs (not shown). Each MU 840 offers additional storage on which games, game parameters, and other data may be stored. In some implementations, the other data can include any of a digital game component, an executable gaming application, an instruction set for expanding a gaming application, and a media file. When inserted into console 800 or a controller, MU 840 can be accessed by memory controller 802. A system power supply module 850 provides power to the components of gaming system 800. A fan 852 cools the circuitry within console 800. A microcontroller unit 854 is also provided.

An application 860 comprising machine instructions is stored on hard disk drive 808. When console 800 is powered on, various portions of application 860 are loaded into RAM 806, and/or caches 810 and 812, for execution on CPU 801, wherein application 860 is one such example. Various applications can be stored on hard disk drive 808 for execution on CPU 801.

Gaming and media system 800 may be operated as a standalone system by simply connecting the system to monitor 16 (FIG. 1A), a television, a video projector, or other display device. In this standalone mode, gaming and media system 800 enables one or more players to play games, or enjoy digital media, e.g., by watching movies, or listening to music. However, with the integration of broadband connectivity made available through network interface 832, gaming and media system 800 may further be operated as a participant in a larger network gaming community.

The system described above can be used to add virtual images to a user's view such that the virtual images are mixed with real images that the user see. In one example, the virtual images are added in a manner such that they appear to be part of the original scene. Examples of adding the virtual images can be found U.S. patent application Ser. No. 13/112,919, "Event Augmentation With Real-Time Information," filed on May 20, 2011; and U.S. patent application Ser. No. 12/905,952, "Fusing Virtual Content Into Real Content," filed on Oct. 15, 2010; both applications are incorporated herein by reference in their entirety.

Technology is presented below for augmenting a user experience at various situations. In one embodiment, an information provider prepares supplemental information regarding actions and objects occurring within an event. A user wearing an at least partially see-through, head mounted display can register (passively or actively) their presence at an event or location and a desire to receive information about the event or location. FIG. 22 illustrates a block diagram of a system for implementing the augmenting of the user experience. For example, FIG. 22 shows a personal audio/visual ("A/V") apparatus 902 in communication with a Supplemental Information Provider 904 via one or more networks 906.

In one embodiment, the personal NV apparatus 902 can be head mounted display device 2 (or other AN apparatus) in communication with a local processing apparatus (e.g., processing unit 4 of FIG. 1A, mobile device 5 of FIG. 1B or other suitable data processing device). One or more networks 906 can include wired and/or wireless networks, such as a LAN, WAN, WiFi, the Internet, an Intranet, cellular network etc. No specific type of network or communication means is required. In one embodiment, Supplemental Information Provider 904 is implemented in hub computing system 12 (See FIG. 1A). However, Supplemental Information Provider 904 can also be implemented in other types of computing devices (e.g., desktop computers, laptop computers, servers, mobile computing devices, tablet computers, mobile telephones, etc.). Supplemental Information Provider 904 can be implemented as one computing devices or multiple computing devices. In one embodiment, Supplemental Information Provider 904 is located locally to personal NV apparatus 902 so that they communication over a local area network, WiFi, Bluetooth or other short range communication means. In another embodiment, Supplemental Information Provider 904 is located remotely from personal NV apparatus 902 so that they communication over the Internet, cellular network or other longer range communication means.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for presenting a collaboration experience using a see-through head mounted display apparatus, comprising:
   determining a three dimensional location of the apparatus, the apparatus includes one or more sensors and a see-through display;
   determining an orientation of the apparatus;
   determining a gaze of a wearer looking through the see-through display of the apparatus;
   determining a three dimensional location of one or more users in the field of view of the user through the see-through display, the determining of the three dimensional location of the one or more users is performed using the one or more sensors;

receiving a selection of collaboration data and a selection of a collaboration environment within the field of view from the wearer;

rendering virtual representations of the collaboration data in the field of view;

determining persons in the wearer's field of view to be included in collaboration environment and who are permitted to share information in the collaboration environment;

outputting shared collaboration data in the form of virtual objects to users in the collaboration environment having audio/visual devices in the collaboration environment;

identifying collaboration permissions for each person in the field of view of the wearer, the collaboration permissions permitting the share of information subject to authentication;

displaying a virtual control menu on one or more of the virtual objects to select varying levels of the collaboration permissions for each person, thereby enabling the wearer to selectively and independently display the virtual objects to each person in the collaboration environment based on the selected level of collaboration permissions and from a perspective of the field of view of each person in the collaboration environment;

receiving input from the users in the collaboration environment on the virtual object, the input manipulating a change in the virtual object; and displaying the change in the virtual object to the wearer.

2. The method of claim 1 further including:
determining the location of real world objects in the field of view of the one or more users;
rendering the virtual objects in relation to the real world objects in the collaboration environment.

3. The method of claim 1 further including defining a first set of users and a second set of users in the collaboration environment, the first set of users receiving a version of the collaboration objects and the second set of users receiving a more limited version of the collaboration objects.

4. The method of claim 1 wherein receiving a selection includes presenting the one or more users with a set of virtual objects for the collaboration environment and receiving a selection of the virtual objects.

5. The method of claim 1 further including presenting a set of object controls in the field of view of the wearer, the object controls including at least collaboration permission controls for the one or more users in the collaboration environment.

6. The method of claim 1 further including displaying the collaboration permissions for each person in the field of view of the wearer.

7. The method of claim 1 further including determining an associated audio/visual device for each of the one or more users in the collaboration environment, including determining the audio/visual capabilities of the audio visual device associated with each of the one or more users.

8. The method of claim 7 further including displaying the audio/visual capabilities of each device associated with each of the one or more users and wherein the outputting includes outputting objects suitable for the audio visual capability of each device.

9. The method of claim 8 further including translating changes for a virtual object in received input from the one or more users to a format suitable for the audio/visual capability of each device.

10. A method for presenting a collaboration experience, comprising:

creating a collaboration environment defined by at least one wearer of a see-through head mounted display apparatus by receiving from the wearer a selection of collaboration data and a selection of a collaboration environment within the field of view and a definition of which users in the collaboration environment are permitted to share information in the collaboration environment;

determining three dimensional locations of the users in the collaboration environment including, for the users having see-through head mounted display apparatuses:
automatically determining an orientation of the apparatus, and
automatically determining a gaze of each of the users looking through the see-through display of the apparatus;

receiving from the users in the collaboration environment shared virtual objects;

outputting the shared virtual objects to the users having audio/visual devices in the collaboration environment;

identifying collaboration permissions for each person in the field of view of the wearer, the collaboration permissions permitting the share of information subject to authentication;

displaying a virtual control menu on one or more of the virtual objects to select varying levels of the collaboration permissions for each person, thereby enabling the wearer to selectively and independently display the virtual objects to each person in the collaboration environment based on the selected level of collaboration permissions and from a perspective of the field of view of each person in the collaboration environment;

receiving input from the users in the shared environment on the virtual object, the input manipulating a change in the virtual object; and outputting the change in the virtual object in the apparatus.

11. The method of claim 10 further including:
determining an associated audio/visual device for each of the users in the collaboration environment, including determining the audio/visual capabilities of the audio visual device associated with each of the users;
translating changes for a virtual object in received input from the users to a format suitable for the audio/visual capability of each device.

12. The method of claim 11 wherein translating includes providing a representation of a virtual object manipulated in a see-through head mounted display to a two dimensional display of an audio/visual device.

13. The method of claim 11 further including authenticating the users and associated audio/visual devices in the collaboration environment by a combination of biometric factors.

14. The method of claim 11 further including managing permissions for shared experience by allowing or blocking applications for use of particular functions of the audio/visual device.

15. A see-through head mounted display apparatus presenting a collaboration environment to a wearer's field of view, comprising:
a see-through, near-eye, augmented reality display that is worn by a wearer;
one or more processing devices in communication with the apparatus, the one or more processing devices automatically determine that the wearer is at a location, the one or more processing devices determine real objects and other persons in the field of view of the wearer, the one or more processing devices determine a collaboration environment in the field of view of the wearer, the environment including users authorized to see collaboration information in the form of virtual objects in the environment, the one or more processing devices identifying collaboration permissions for each person in the field of view of the wearer, the collaboration permissions permitting access to the collaboration information subject to authentication; the one or more processing devices displaying a virtual control menu on one or more of the virtual objects to select varying levels of the collaboration permissions for each person, thereby enabling the wearer to selectively and independently display the virtual objects to each person in the collaboration environment based on the selected level of collaboration permissions and from a perspective of the field of view of each person in the collaboration environment, the one or more processing devices rendering virtual objects and user actions in the collaboration environment including managing information provided to the users in the collaboration environment; and the collaboration environment including a plurality of audio/visual devices configured to render information, including see-through head mounted display devices and other devices.

16. The apparatus of claim 15 wherein the one or more processing devices render an auditory or visual representation of collaboration permissions assigned to each of the users relative to the collaboration information.

17. The apparatus of claim 16 wherein the one or more processing devices render an auditory or visual representation of user identity and associated processing devices and device capability.

18. The apparatus of claim 17 wherein the one or more processing devices render an auditory or visual representation of user sharing links between the users and user devices.

19. The apparatus of claim 18 wherein the one or more processing devices render an auditory or visual representation of a set of virtual objects for the collaboration environment and receiving a selection of the virtual objects.

20. The apparatus of claim 19 wherein the one or more processing devices render a set of object controls in the field of view of the wearer, the object controls including at least collaboration permission controls for users in the collaboration environment.

* * * * *